United States Patent
Shuai et al.

(10) Patent No.: US 12,494,157 B2
(45) Date of Patent: Dec. 9, 2025

(54) DRIVING METHOD FOR DISPLAY PANEL, AND DISPLAY DEVICE

(71) Applicants: Wuhan BOE Optoelectronics Technology Co., Ltd., Hubei (CN); BOE Technology Group Co., Ltd., Beijing (CN)

(72) Inventors: Mengchao Shuai, Beijing (CN); Lijun Xiao, Beijing (CN); Bing Li, Beijing (CN); Junmin Zhang, Beijing (CN); Feng Jiang, Beijing (CN); Meng Feng, Beijing (CN); Jianmin Xiang, Beijing (CN); Ziming Yang, Beijing (CN); Yun Bai, Beijing (CN)

(73) Assignees: Wuhan BOE Optoelectronics Technology Co., Ltd., Hubei (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/604,355

(22) Filed: Mar. 13, 2024

(65) Prior Publication Data
US 2024/0221602 A1    Jul. 4, 2024

Related U.S. Application Data

(63) Continuation of application No. PCT/CN2021/124944, filed on Oct. 20, 2021.

(51) Int. Cl.
G09G 3/20    (2006.01)

(52) U.S. Cl.
CPC ......... G09G 3/2096 (2013.01); G09G 3/2074 (2013.01); *G09G 2300/0452* (2013.01);
(Continued)

(58) Field of Classification Search
None
See application file for complete search history.

(56) References Cited

U.S. PATENT DOCUMENTS

| 6,108,046 A * | 8/2000 | Wu .................. H04N 21/426 |
| | | 375/E7.274 |
| 7,519,266 B1 * | 4/2009 | Willis .................. G11B 27/036 |
| | | 386/350 |

(Continued)

FOREIGN PATENT DOCUMENTS

| CN | 101051446 A | 10/2007 |
| CN | 101763815 A | 6/2010 |

(Continued)

OTHER PUBLICATIONS

CN 202180002990.0 first office action dated Oct. 31, 2024.
PCT/CN2021/124944 international search report dated Jun. 22, 2022.

*Primary Examiner* — Patrick N Edouard
*Assistant Examiner* — Peijie Shen
(74) *Attorney, Agent, or Firm* — IPro, PLLC

(57) ABSTRACT

Provided are a method for driving a display panel, and a display device. When switching from a first picture to a second picture is performed and the second picture is displayed in at least two consecutive display frames, display data of the second picture is received in the current display frame of the second picture; whether the second picture is a poor picture is determined according to the display data and a poor picture determining condition; and when the second picture is a poor picture, a display panel is controlled to perform scanning driving every at least one row of sub-pixels, and in two rows of sub-pixels subjected to scanning driving, when the first row of sub-pixels has been driven and the second row of sub-pixels is being driven, display data (Continued)

corresponding to the second row of sub-pixels is loaded to a data line connected to the second row.

9 Claims, 16 Drawing Sheets

(52) U.S. Cl.
CPC ............... *G09G 2300/0871* (2013.01); *G09G 2310/0224* (2013.01); *G09G 2310/0262* (2013.01); *G09G 2320/0693* (2013.01); *G09G 2330/021* (2013.01)

(56) References Cited

U.S. PATENT DOCUMENTS

| | | | | |
|---|---|---|---|---|
| 9,472,135 | B2* | 10/2016 | Wen | G09G 3/3225 |
| 2002/0047822 | A1* | 4/2002 | Senda | G09G 3/32 |
| | | | | 345/90 |
| 2005/0206422 | A1* | 9/2005 | Mehas | H02M 3/1588 |
| | | | | 327/205 |
| 2006/0274158 | A1* | 12/2006 | Tatsumi | H04N 7/012 |
| | | | | 348/222.1 |
| 2007/0047164 | A1* | 3/2007 | Biagi | G11C 5/005 |
| | | | | 361/78 |
| 2007/0171161 | A1* | 7/2007 | Lin | G09G 3/3685 |
| | | | | 345/87 |
| 2007/0222733 | A1* | 9/2007 | Ju | G09G 3/3622 |
| | | | | 345/98 |
| 2008/0151103 | A1* | 6/2008 | Asamura | H04N 7/012 |
| | | | | 348/E7.003 |
| 2008/0278467 | A1 | 11/2008 | Hwang et al. | |
| 2009/0058789 | A1 | 3/2009 | Hung et al. | |
| 2010/0026617 | A1 | 2/2010 | Su et al. | |
| 2011/0227961 | A1* | 9/2011 | Kikuta | G09G 3/3225 |
| | | | | 345/690 |
| 2013/0229398 | A1* | 9/2013 | Lee | G09G 3/3614 |
| | | | | 345/96 |
| 2014/0002431 | A1 | 1/2014 | Shibata et al. | |
| 2016/0035297 | A1* | 2/2016 | Oh | G09G 3/2092 |
| | | | | 345/94 |
| 2016/0055784 | A1* | 2/2016 | Koh | G06T 7/90 |
| | | | | 345/694 |
| 2016/0210919 | A1* | 7/2016 | Nakanishi | G09G 3/3648 |
| 2018/0166023 | A1 | 6/2018 | Tomizawa | |
| 2018/0174528 | A1* | 6/2018 | Botzas | G09G 5/02 |
| 2020/0105180 | A1* | 4/2020 | Wang | G09G 3/3677 |
| 2020/0219461 | A1* | 7/2020 | Liu | G09G 3/3688 |
| 2021/0183319 | A1* | 6/2021 | Cho | G09G 3/2088 |
| 2022/0319409 | A1* | 10/2022 | Park | G09G 3/3266 |

FOREIGN PATENT DOCUMENTS

| | | |
|---|---|---|
| CN | 105374309 A | 3/2016 |
| CN | 105139819 B | 8/2017 |
| CN | 109064965 A | 12/2018 |
| CN | 109599070 A | 4/2019 |
| CN | 109599071 A | 4/2019 |
| CN | 110085167 A | 8/2019 |
| CN | 112750399 A | 5/2021 |
| CN | 112885277 A | 6/2021 |
| KR | 980010990 A | 4/1998 |
| KR | 20010058393 A | 7/2001 |
| TW | 200737082 A | 10/2007 |

* cited by examiner

| S11 | S12 | S13 | S14 | S15 | S16 | S17 | S18 | S19 | S110 | S111 | S112 |
|---|---|---|---|---|---|---|---|---|---|---|---|
| S21 | S22 | S23 | S24 | S25 | S26 | S27 | S28 | S29 | S210 | S211 | S212 |
| S31 | S32 | S33 | S34 | S35 | S36 | S37 | S38 | S39 | S310 | S311 | S312 |
| S41 | S42 | S43 | S44 | S45 | S46 | S47 | S48 | S49 | S410 | S411 | S412 |
| S51 | S52 | S53 | S54 | S55 | S56 | S57 | S58 | S59 | S510 | S511 | S512 |
| S61 | S62 | S63 | S64 | S65 | S66 | S67 | S68 | S69 | S610 | S611 | S612 |
| S71 | S72 | S73 | S74 | S75 | S76 | S77 | S78 | S79 | S710 | S711 | S712 |
| S81 | S82 | S83 | S84 | S85 | S86 | S87 | S88 | S89 | S810 | S811 | S812 |
| S91 | S92 | S93 | S94 | S95 | S96 | S97 | S98 | S99 | S910 | S911 | S912 |
| S101 | S102 | S103 | S104 | S105 | S106 | S107 | S108 | S109 | S1010 | S1011 | S1012 |

| S11 | S12 | S13 | S14 | S15 | S16 | S17 | S18 | S19 | S110 | S111 | S112 |
|---|---|---|---|---|---|---|---|---|---|---|---|
| S21 | S22 | S23 | S24 | S25 | S26 | S27 | S28 | S29 | S210 | S211 | S212 |
| S31 | S32 | S33 | S34 | S35 | S36 | S37 | S38 | S39 | S310 | S311 | S312 |
| S41 | S42 | S43 | S44 | S45 | S46 | S47 | S48 | S49 | S410 | S411 | S412 |
| S51 | S52 | S53 | S54 | S55 | S56 | S57 | S58 | S59 | S510 | S511 | S512 |
| S61 | S62 | S63 | S64 | S65 | S66 | S67 | S68 | S69 | S610 | S611 | S612 |
| S71 | S72 | S73 | S74 | S75 | S76 | S77 | S78 | S79 | S710 | S711 | S712 |
| S81 | S82 | S83 | S84 | S85 | S86 | S87 | S88 | S89 | S810 | S811 | S812 |
| S91 | S92 | S93 | S94 | S95 | S96 | S97 | S98 | S99 | S910 | S911 | S912 |
| S101 | S102 | S103 | S104 | S105 | S106 | S107 | S108 | S109 | S1010 | S1011 | S1012 |

| S11 | S12 | S13 | S14 | S15 | S16 | S17 | S18 | S19 | S110 | S111 | S112 |
|---|---|---|---|---|---|---|---|---|---|---|---|
| S21 | S22 | S23 | S24 | S25 | S26 | S27 | S28 | S29 | S210 | S211 | S212 |
| S31 | S32 | S33 | S34 | S35 | S36 | S37 | S38 | S39 | S310 | S311 | S312 |
| S41 | S42 | S43 | S44 | S45 | S46 | S47 | S48 | S49 | S410 | S411 | S412 |
| S51 | S52 | S53 | S54 | S55 | S56 | S57 | S58 | S59 | S510 | S511 | S512 |
| S61 | S62 | S63 | S64 | S65 | S66 | S67 | S68 | S69 | S610 | S611 | S612 |
| S71 | S72 | S73 | S74 | S75 | S76 | S77 | S78 | S79 | S710 | S711 | S712 |
| S81 | S82 | S83 | S84 | S85 | S86 | S87 | S88 | S89 | S810 | S811 | S812 |
| S91 | S92 | S93 | S94 | S95 | S96 | S97 | S98 | S99 | S910 | S911 | S912 |
| S101 | S102 | S103 | S104 | S105 | S106 | S107 | S108 | S109 | S1010 | S1011 | S1012 |

| S11 | S12 | S13 | S14 | S15 | S16 | S17 | S18 | S19 | S110 | S111 | S112 |
|---|---|---|---|---|---|---|---|---|---|---|---|
| S21 | S22 | S23 | S24 | S25 | S26 | S27 | S28 | S29 | S210 | S211 | S212 |
| S31 | S32 | S33 | S34 | S35 | S36 | S37 | S38 | S39 | S310 | S311 | S312 |
| S41 | S42 | S43 | S44 | S45 | S46 | S47 | S48 | S49 | S410 | S411 | S412 |
| S51 | S52 | S53 | S54 | S55 | S56 | S57 | S58 | S59 | S510 | S511 | S512 |
| S61 | S62 | S63 | S64 | S65 | S66 | S67 | S68 | S69 | S610 | S611 | S612 |
| S71 | S72 | S73 | S74 | S75 | S76 | S77 | S78 | S79 | S710 | S711 | S712 |
| S81 | S82 | S83 | S84 | S85 | S86 | S87 | S88 | S89 | S810 | S811 | S812 |
| S91 | S92 | S93 | S94 | S95 | S96 | S97 | S98 | S99 | S910 | S911 | S912 |
| S101 | S102 | S103 | S104 | S105 | S106 | S107 | S108 | S109 | S1010 | S1011 | S1012 |

| S11 | S12 | S13 | S14 | S15 | S16 | S17 | S18 | S19 | S110 | S111 | S112 |
|---|---|---|---|---|---|---|---|---|---|---|---|
| S21 | S22 | S23 | S24 | S25 | S26 | S27 | S28 | S29 | S210 | S211 | S212 |
| S31 | S32 | S33 | S34 | S35 | S36 | S37 | S38 | S39 | S310 | S311 | S312 |
| S41 | S42 | S43 | S44 | S45 | S46 | S47 | S48 | S49 | S410 | S411 | S412 |
| S51 | S52 | S53 | S54 | S55 | S56 | S57 | S58 | S59 | S510 | S511 | S512 |
| S61 | S62 | S63 | S64 | S65 | S66 | S67 | S68 | S69 | S610 | S611 | S612 |
| S71 | S72 | S73 | S74 | S75 | S76 | S77 | S78 | S79 | S710 | S711 | S712 |
| S81 | S82 | S83 | S84 | S85 | S86 | S87 | S88 | S89 | S810 | S811 | S812 |
| S91 | S92 | S93 | S94 | S95 | S96 | S97 | S98 | S99 | S910 | S911 | S912 |
| S101 | S102 | S103 | S104 | S105 | S106 | S107 | S108 | S109 | S1010 | S1011 | S1012 |

| S11 | S12 | S13 | S14 | S15 | S16 | S17 | S18 | S19 | S110 | S111 | S112 |
|---|---|---|---|---|---|---|---|---|---|---|---|
| S21 | S22 | S23 | S24 | S25 | S26 | S27 | S28 | S29 | S210 | S211 | S212 |
| S31 | S32 | S33 | S34 | S35 | S36 | S37 | S38 | S39 | S310 | S311 | S312 |
| S41 | S42 | S43 | S44 | S45 | S46 | S47 | S48 | S49 | S410 | S411 | S412 |
| S51 | S52 | S53 | S54 | S55 | S56 | S57 | S58 | S59 | S510 | S511 | S512 |
| S61 | S62 | S63 | S64 | S65 | S66 | S67 | S68 | S69 | S610 | S611 | S612 |
| S71 | S72 | S73 | S74 | S75 | S76 | S77 | S78 | S79 | S710 | S711 | S712 |
| S81 | S82 | S83 | S84 | S85 | S86 | S87 | S88 | S89 | S810 | S811 | S812 |
| S91 | S92 | S93 | S94 | S95 | S96 | S97 | S98 | S99 | S910 | S911 | S912 |
| S101 | S102 | S103 | S104 | S105 | S106 | S107 | S108 | S109 | S1010 | S1011 | S1012 |
| S111 | S112 | S113 | S114 | S115 | S116 | S117 | S118 | S119 | S1110 | S1111 | S1112 |
| S121 | S122 | S123 | S124 | S125 | S126 | S127 | S128 | S129 | S1210 | S1211 | S1212 |

DRIVING METHOD FOR DISPLAY PANEL, AND DISPLAY DEVICE

CROSS-REFERENCE TO RELATED APPLICATIONS

This application is a continuation of International Application No. PCT/CN2021/124944, filed on Oct. 20, 2021, which is hereby incorporated by reference in its entirety.

TECHNICAL FIELD

The present disclosure relates to the field of display technology, and in particular to a method for driving a display panel and a display device.

BACKGROUND

Displays such as a liquid crystal display (LCD) and an organic light-emitting diode (OLED) generally include a plurality of pixels. Each pixel may include: a red sub-pixel, a green sub-pixel and a blue sub-pixel. By controlling display data corresponding to each sub-pixel, the display brightness of each sub-pixel is controlled, so as to display color images by mixing to-be-required and displayed colors.

SUMMARY

A method for driving a display panel provided by embodiments of the present disclosure includes:
when switching from a first image to a second image and the second image is displayed in at least two consecutive display frames, receiving display data of the second image in a current display frame of the second image;
determining whether the second image is a defective image according to the display data of the second image and a condition for determining a defective image; and
when it is determined that the second image is the defective image, controlling the display panel to perform scanning and driving at least one row of sub-pixels apart, and in two rows of sub-pixels that are scanned and driven, when a first row of sub-pixels is driven and a second row of sub-pixels is in a process of being driven, loading display data corresponding to the second row of sub-pixels to data lines connected with the second row of sub-pixels.

In some embodiments, the condition for determining the defective image includes: a set area threshold of a defective region and a set gray scale difference threshold between gray scales of display data corresponding to two adjacent sub-pixels in a same column; and
the determining that the second image is the defective image specifically includes: determining a target region formed by sub-pixels corresponding to display data satisfying the set gray scale difference threshold in the display data of the second image; and determining that the second image is the defective image when the target region satisfies the set area threshold.

In some embodiments, the determining the target region formed by the sub-pixels corresponding to the display data satisfying the set gray scale difference threshold in the display data of the second image, specifically includes:
dividing pixel units in the display panel into a plurality of unit groups by taking at least one column of pixel units in at least two adjacent rows as a unit group;
for display data corresponding to each unit group, determining a gray scale difference between gray scales of display data corresponding to two adjacent rows of sub-pixels in the same column;
when the gray scale difference satisfies the set gray scale difference threshold, defining a unit group where sub-pixels corresponding to the gray scale difference satisfying the set gray scale difference threshold are located as a target unit group; and
forming the target region by all target unit groups.

In some embodiments, the controlling the display panel to perform scanning and driving at least one row of sub-pixels apart, and in two rows of sub-pixels that are scanned and driven, when the first row of sub-pixels is driven and the second row of sub-pixels is in the process of being driven, loading the display data corresponding to the second row of sub-pixels to the data lines connected with the second row of sub-pixels, specifically includes:
in a display frame after the current display frame, controlling the display panel to perform scanning and driving at least one row of sub-pixels apart, and in the two rows of sub-pixels that are scanned and driven, when the first row of sub-pixels is driven and the second row of sub-pixels is in the process of being driven, loading the display data of the second image to the data lines connected with the second row of sub-pixels.

In some embodiments, the controlling the display panel to perform scanning and driving at least one row of sub-pixels apart, and in the two rows of sub-pixels that are scanned and driven, when the first row of sub-pixels is driven and the second row of sub-pixels is in the process of being driven, loading the display data of the second image to the data lines connected with the second row of sub-pixels, specifically includes:
in an odd-numbered display frame after the current display frame, controlling sub-pixels in an odd-numbered row of the display panel to perform scanning and driving, and outputting display data corresponding to the sub-pixels in the odd-numbered row to each of the data lines; and
in an even-numbered display frame after the current display frame, controlling sub-pixels in an even-numbered row of the display panel to perform scanning and driving, and outputting display data corresponding to the sub-pixels in the even-numbered row to each of the data lines.

In some embodiments, the controlling the display panel to perform scanning and driving at least one row of sub-pixels apart includes:
in an odd-numbered display frame after the current display frame, controlling sub-pixels in an even-numbered row of the display panel to perform scanning and driving, and outputting display data corresponding to the sub-pixels in the even-numbered row to each of the data lines; and
in an even-numbered display frame after the current display frame, controlling sub-pixels of an odd-numbered row of the display panel to performing scanning and driving, and outputting the display data corresponding to the sub-pixels of the odd-numbered row to each of the data lines.

In some embodiments, in the current display frame, whether the second image is the defective image is determined according to the display data of the second image and the condition for determining the defective image.

The display device provided by the embodiments of the present disclosure includes:

a display panel; and a timing controller, configured to receive display data of a second image in a current display frame of the second image when switching from a first image to the second image and the second image is displayed in at least two consecutive display frames; determine whether the second image is a defective image according to the display data of the second image and a condition for determining a defective image; and when it is determined that the second image is the defective image, input an interlaced scanning control signal to a gate driving circuit of the display panel and input an interlaced data control signal to a source driving circuit of the display panel, to control the display panel to perform scanning and driving at least one row of sub-pixels apart, and to load display data corresponding to a second row of sub-pixels to data lines connected with the second row of sub-pixels when a first row of sub-pixels is driven and the second row of sub-pixels is in a process of being driven in two rows of sub-pixels that are scanned and driven.

In some embodiments, the timing controller is further configured to input a progressive scanning control signal to the gate driving circuit of the display panel and input a progressive data control signal to the source driving circuit of the display panel when it is determined that the second image is not the defective picture, control the display panel to scan and drive sub-pixels row by row, and load display data corresponding to each row of sub-pixels to each of the data lines.

In some embodiments, the timing controller and the source driving circuit are coupled through a general purpose input and output interface;

the timing controller is further configured to output the interlaced data control signal by setting a driving enable pin of the general purpose input and output interface to an active level of interlaced driving; and output the progressive data control signal by setting the driving enable pin of the general purpose input and output interface to an active level of progressive driving;

and the source driving circuit is further configured to generate an interlaced data output signal when detecting that a level of the driving enable pin is the active level of interlaced driving, and load the display data corresponding to the second row of sub-pixels to the data lines connected with the second row of sub-pixels according to the generated interlaced data output signal; and generate a progressive data output signal when detecting that the level of the driving enable pin is the active level of progressive driving, and load the display data corresponding to each row of sub-pixels to each of the data lines according to the generated progressive data output signal.

In some embodiments, the timing controller is further configured to switch the level of the driving enable pin from a first level to a second level, as the active level of interlaced driving; and maintain the level of the driving enable pin at the first level, as the active level of progressive driving; and the source driving circuit is further configured to compare a voltage corresponding to the level of the driving enable pin with a stored set voltage threshold, generate the interlaced data output signal when the voltage corresponding to the level of the driving enable pin is higher than the set voltage threshold, and generate the progressive data output signal when the voltage corresponding to the level of the driving enable pin is not higher than the set voltage threshold.

In some embodiments, the timing controller is coupled to a level shift circuit through a general purpose input and output interface;

the timing controller is further configured to output a first setting bit with a first number and a second setting bit with the first number and a second number through the general purpose input and output interface, as the interlaced data control signal for output; and output a first setting bit with a second number through the general purpose input and output interface, as a progressive driving enable signal for output; and the source driving circuit is further configured to generate the interlaced data output signal according to the second setting bit when detecting that the first setting bit is the first number; and generate the progressive data output signal when detecting that the first setting bit is the second number.

BRIEF DESCRIPTION OF FIGURES

FIG. 4 is a schematic diagram of a target region of a second image according to an embodiment of the present disclosure.

FIG. 5A is some schematic diagrams of a second image determined as a defective image according to an embodiment of the present disclosure.

FIG. 5B is some other schematic diagrams of a second image determined as a defective image according to an embodiment of the present disclosure.

FIG. 5C is still some schematic diagrams of a second image determined as a defective image according to an embodiment of the present disclosure.

FIG. 5D is still some schematic diagrams of a second image determined as a defective image according to an embodiment of the present disclosure.

FIG. 5E is still some schematic diagrams of a second image determined as a defective image according to an embodiment of the present disclosure.

DETAILED DESCRIPTION

Figure 1A:
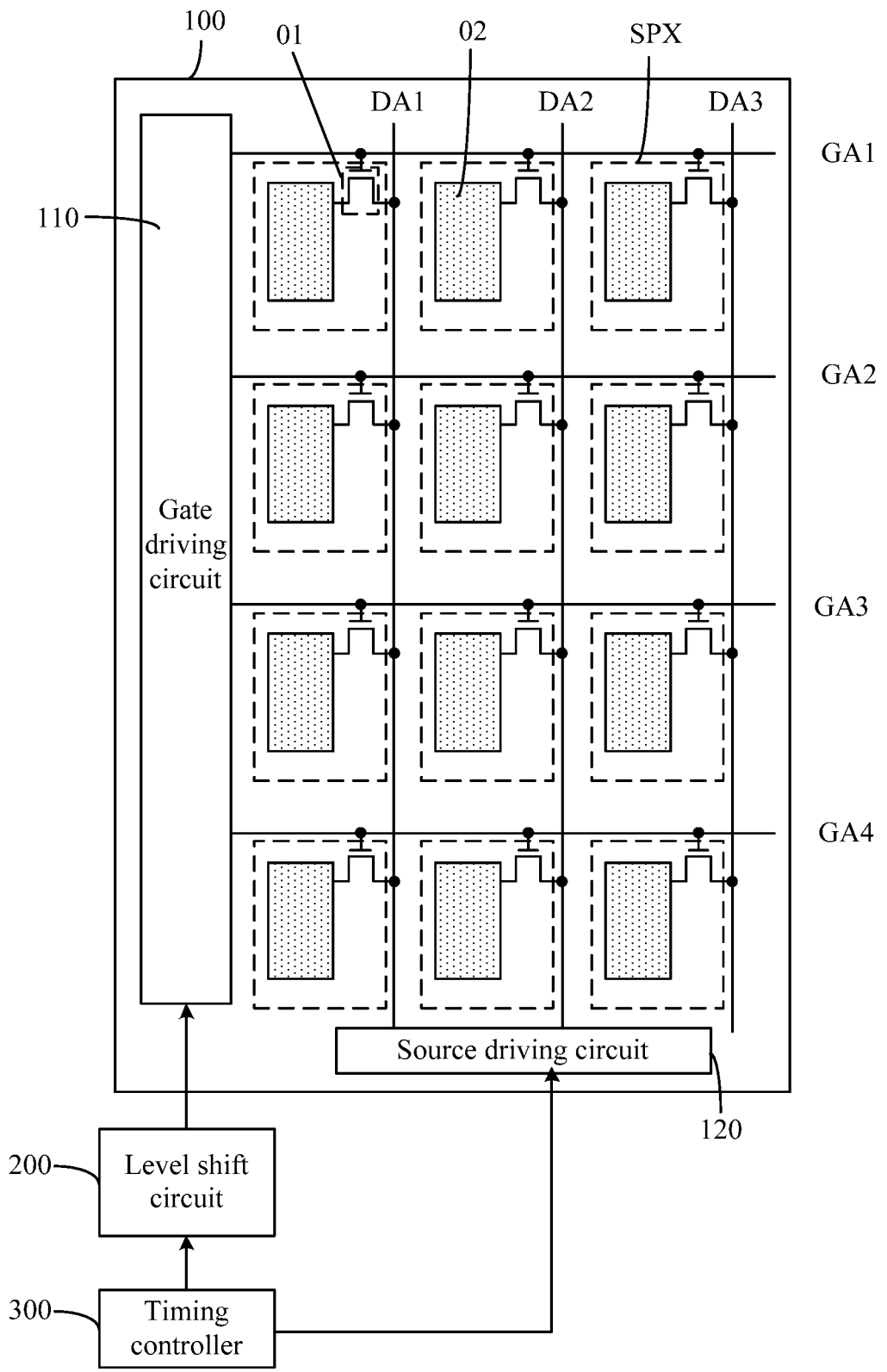
FIG. 1A is a schematic diagram of some structures of a display device according to an embodiment of the present disclosure.

In order to make the purpose, technical solutions and advantages of embodiments of the present disclosure clearer, the technical solutions of the embodiments of the present disclosure will be clearly and completely described below in conjunction with drawings of the embodiments of the present disclosure. Apparently, the described embodiments are some but not all of the embodiments of the present disclosure. In the case of no conflict, the embodiments in the present disclosure and the features in the embodiments can be combined with each other. Based on the described embodiments of the present disclosure, all other embodiments obtained by persons of ordinary skill in the art without creative effort fall within the protection scope of the present disclosure.

Unless otherwise defined, technical or scientific terms used in the present disclosure shall have the ordinary meanings as understood by those with ordinary skills in the art to which the present disclosure belongs. "First", "second" and similar words used in the present disclosure do not indicate any order, quantity or importance, but are only used to distinguish different components. "Comprise" or "include" or other similar words mean that the element or item appearing before the word encompasses the element or item listed after the word and its equivalents, but does not exclude other elements or items. "Connecting" or "connected" or similar words are not limited to physical or mechanical connections, but may include electrical connections, whether directly or indirectly.

It should be noted that a size and shape of each figure in the drawings do not reflect a true scale, but are only intended to illustrate the present disclosure. And the same or similar reference numerals denote the same or similar elements or elements having the same or similar functions throughout.

Referring to FIG. 1A, a display device may include a display panel 100, a level shift circuit 200 and a timing controller 300. Here, the display panel 100 may include a plurality of pixel units arranged in an array, a plurality of gate lines (such as GA1, GA2, GA3, GA4), a plurality of data lines (such as DA1, DA2, DA3), a gate driving circuit 110 and a source driving circuit 120. The gate driving circuit 110 is coupled to the gate lines GA1, GA2, GA3, GA4 respectively, and the source driving circuit 120 is coupled to the data lines DA1, DA2, DA3 respectively. Exemplarily, each pixel unit includes a plurality of sub-pixels SPX. For example, a pixel unit may include a red sub-pixel(s), a green sub-pixel(s) and a blue sub-pixel(s), so that red, green and blue colors may be mixed to achieve color display. Alternatively, the pixel unit may also include a red sub-pixel(s), a green sub-pixel(s), a blue sub-pixel(s) and a white sub-pixel(s), so that red, green, blue and white colors may be mixed to achieve color display. Of course, in practical applications, the luminous color of the sub-pixels in the pixel unit may be designed and determined according to the practical application environment, which is not limited herein.

As shown in FIG. 1A, each sub-pixel includes a transistor 01 and a pixel electrode 02. Here, one row of sub-pixels corresponds to one gate line, and one column of sub-pixels corresponds to one data line. A gate of the transistor 01 is electrically connected with a corresponding gate line, a source of the transistor 01 is electrically connected with a corresponding data line, and a drain of the transistor 01 is electrically connected with the pixel electrode 02. It should be noted that the pixel array structure of the present disclosure may also be a double-gate structure, that is, two gate lines are arranged between two adjacent rows of pixels, and this arrangement can reduce half of the data lines, that is, some adjacent columns of pixels have data lines therebetween, while some other adjacent columns of pixels do not have data lines therebetween. The specific arrangement structure of the pixels and the arrangement manners of the data lines and scanning lines are not limited herein.

With the rapid development of display panels in the field of high refresh rate and high resolution, the requirements for image quality and driving capability of the display panels are also increasing. Large-size display panels are difficult to ensure a good charging rate when displaying certain special images, which may lead to problems such as certain defective images and high driver IC temperatures, etc. For example, a refresh frequency of an 8K display panel may be 120 Hz, and a turn-on time of each row of sub-pixels is, for example, $1/(120 \text{ Hz} \times 4500 \text{ rows}) = 1.85$ μs, and a charging time of the sub-pixels is far from enough. If the refresh rate is 240 Hz or higher, the charging time of sub-pixels will be further shortened. Therefore, there will be a greater challenge to ensure the charging rate of sub-pixels and the quality of display. For example, when the display panel displays a static image, insufficient pixel charging time and large differences in gray scales corresponding to two adjacent sub-pixels in the same column will cause defects in the display panel.

Figure 2:
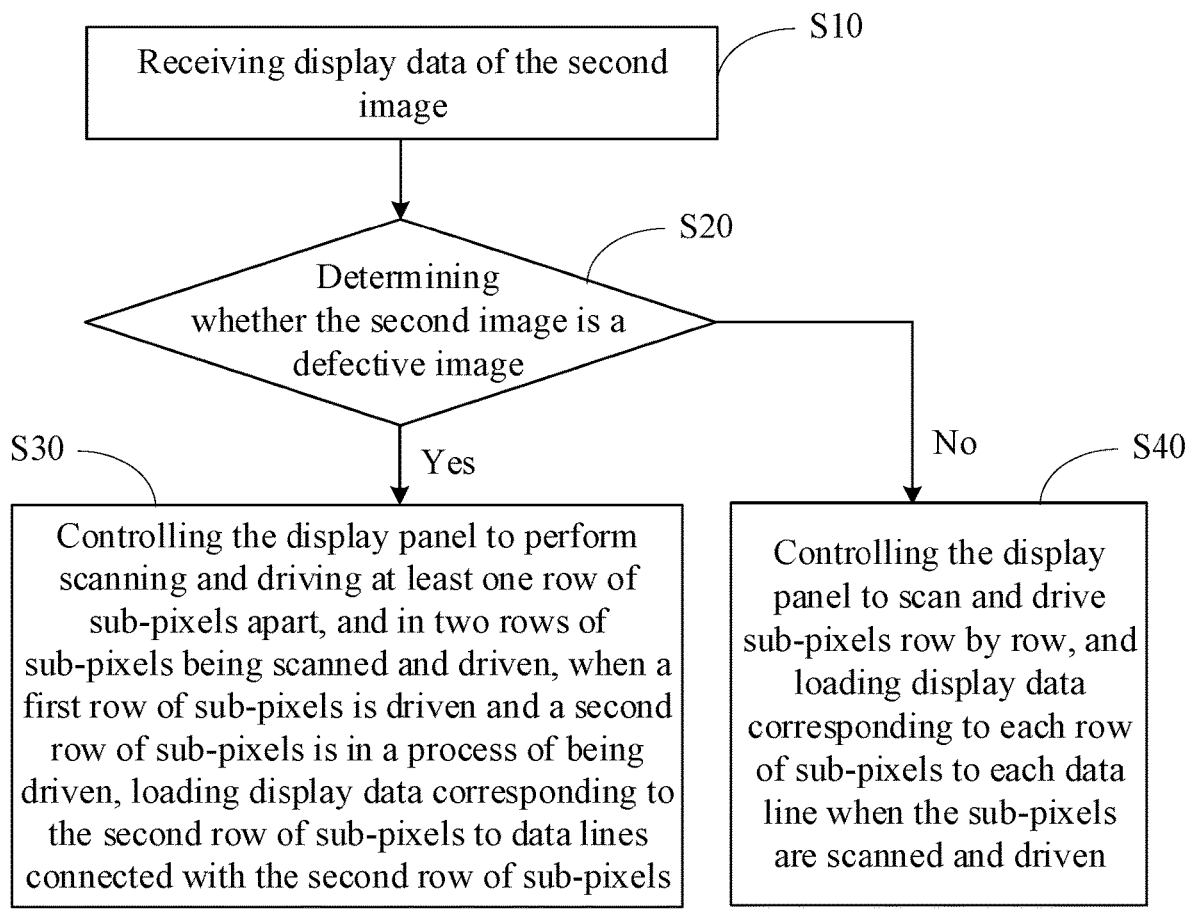
FIG. 2 is a flowchart of a driving method according to an embodiment of the present disclosure.

Embodiments of the present disclosure provide a method for driving a display panel. As shown in FIG. 2, the method may include the following steps.

S10: when switching from a first image to a second image, and the second image is displayed in at least two consecutive display frames, receiving display data of the second image in a current display frame of the second image.

S20: determining whether the second image is a defective image according to the display data of the second image and a condition for determining a defective image; here, when it is determined that the second image is the defective image, going to step S30; when it is determined that the second image is not the defective image, going to step S40.

S30: controlling the display panel to perform scanning and driving at least one row of sub-pixels apart, and in two rows of sub-pixels being scanned and driven, when a first row of sub-pixels has been driven and a second row of sub-pixels is in a process of being driven, loading display data corresponding to the second row of sub-pixels to data lines connected with the second row of sub-pixels.

S40: controlling the display panel to scan and drive sub-pixels row by row, and loading display data corresponding to each row of sub-pixels to each data line when the sub-pixels are being scanned and driven.

In the driving method provided by the embodiments of the present disclosure, when the first image is switched to the second image, it can be indicated that the display panel has switched the images. Further, the second image is displayed in at least two consecutive display frames, which means that the display panel may maintain the display of the same image within a certain period of time, for example, the displayed second image may be a static image. By setting the condition for determining the defective image, the display data of the second image may be analyzed according to the condition for determining the defective image, and whether the second image is a defective image may be determined. When it is determined that the second image is the defective image, the display panel can be controlled to perform scanning and driving at least one row of sub-pixels apart, and in the two rows of sub-pixels being scanned and driven, when the first row of sub-pixels has been driven and the second row of sub-pixels is being driven, the display data corresponding to the second row of sub-pixels is loaded to the data lines connected with the second row of sub-pixels. In this way, when displaying the second image, by implementing the strategy that some of the sub-pixels are displayed and some of the sub-pixels are not displayed, only partial sub-pixels that need to be displayed can be scanned and driven and the display data can be output when displaying the static image, instead of scanning and driving all the sub-pixels and outputting display data for all the sub-pixels, so that power consumption can be reduced and the problem of excessive temperature of the device can be solved. Moreover, when displaying the second image, since at least one row of sub-pixels is spaced to display the image, the remaining rows of sub-pixels are in a black state, and the rows of sub-pixels in the black state no longer display the corresponding image, and thus the problem of a defective image due to insufficient charging time of the pixels and a large difference in the gray scales corresponding to sub-pixels of two adjacent rows in the same column can be avoided.

In the embodiments of the present disclosure, the timing controller may be configured to: when the first image is switched to the second image and the second image is displayed in at least two consecutive display frames, receive the display data of the second image in the current display frame of the second image; determine whether the second image is a defective image based on the display data of the second image and the condition for determining the defective image; when it is determined that the second image is the defective image, input an interlaced scanning control signal to the gate driving circuit of the display panel and input an interlaced data control signal to the source driving circuit of the display panel, to control the display panel to perform scanning and driving at least one row of sub-pixels apart, and to load the display data corresponding to the second row of sub-pixels to the data lines to which the second row of sub-pixels is connected when the first row of sub-pixels has been driven and the second row of sub-pixels is being driven, in the two rows of sub-pixels being scanned and driven. It should be noted that, in the two rows of sub-pixels being scanned and driven, the two rows of sub-pixels here refer to the two rows of sub-pixels for which the corresponding gate lines are turned on, such as interlaced scanning driving, then the two rows of sub-pixels here may refer to the first row of sub-pixels and the third row of sub-pixels; that is, when the scanning signal including an active level is input interlaced, for example, the scanning signal including the active level is input to the first row, and the scanning signal including the active level is input to the third row, then the display data is input to the first row, and the display data is input to the third row. Optionally, for the display data, the first row and the second row are both continuously outputting the display data of the first row, and the third row and the fourth row continuously outputting the display data of the third row, so when the second image is displaying, and the timing controller determines that the second image is the defective image, by enabling the interlaced driving work mode, the image may be displayed at least one row of sub-pixels apart, and the remaining rows of the sub-pixels are in the black state, and the rows of sub-pixels in the black state no longer display the corresponding image, which can avoid the problem of poor image quality due to insufficient charging time of the pixels and large differences in gray scales corresponding to two adjacent rows of sub-pixels in the same column.

Figure 1B:
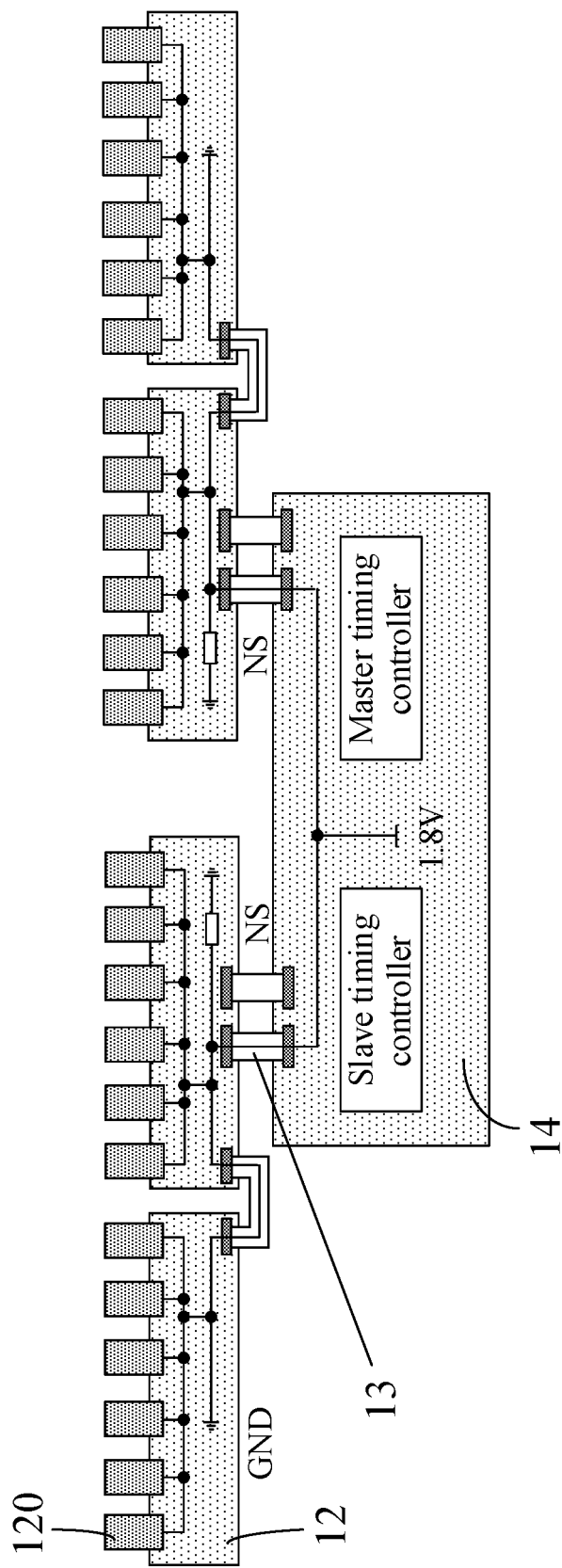
FIG. 1B is a schematic structural diagram of a driving enable pin according to an embodiment of the present disclosure.
Figure 1C:
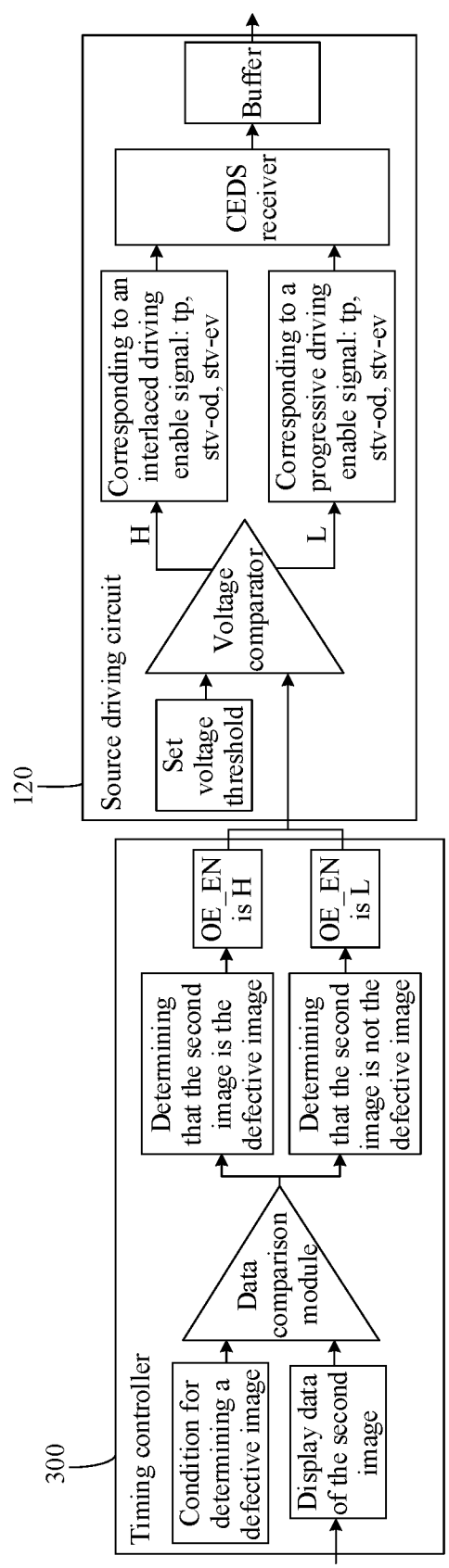
FIG. 1C is a schematic diagram of some other structures of a display device according to an embodiment of the present disclosure.

In the embodiments of the present disclosure, as shown in FIG. 1A, the timing controller 300 is connected with the gate driving circuit 110 through the level shift circuit 200, and the timing controller 300 can be coupled to the source driving circuit 120 through a general purpose input and output (GPIO) interface to transmit signals through the GPIO interface. In the embodiments of the present disclosure, FIG. 1B schematically shows a driving enable pin OE_EN of the GPIO interface coupled between the timing controller and the source driving circuit 120. Here, 120 represents a source driving circuit, 12 represents a printed circuit board (PCB), 13 represents a flexible circuit board (FPC), and 14 represents a timing circuit board where the timing controller is located. Exemplarily, a resistor NS may be provided on the printed circuit board 12 to improve the pull-up driving capability of the driving enable pin OE_EN. Exemplarily, the resistance value of the resistor NS may be 4.7 KΩ, of course, the resistance value of the resistor NS may also be determined according to the requirements of practical applications, which is not limited herein.

Exemplarily, a timing controller may be provided on the timing circuit board, which can reduce integration difficulty. Two timing controllers (for example, one as a master timing controller and the other as a slave timing controller) may also be set on the timing circuit board to improve the driving capability and computing capability, which is beneficial in the display panel with high refresh rates (such as 120 Hz, 240 Hz etc.).

Exemplarily, the timing controller 300 may set the driving enable pin OE_EN of the general purpose input and output interface to an active level of interlaced driving, so as to be output as an interlaced data control signal. And, when the source driving circuit detects that the level of the driving enable pin OE_EN is an active level of interlaced driving, it can generate an interlaced data output signal, and load the display data corresponding to the second row of sub-pixels to the data lines to which the second row of sub-pixels is connected according to the generated interlaced data output signal. For example, the active level of interlaced driving is a high level, and when the source driving circuit detects that the level of the driving enable pin OE_EN is a high level, it can generate an interlaced data output signal, to thereby input the corresponding display data to the data lines in the display panel.

Figure 6:
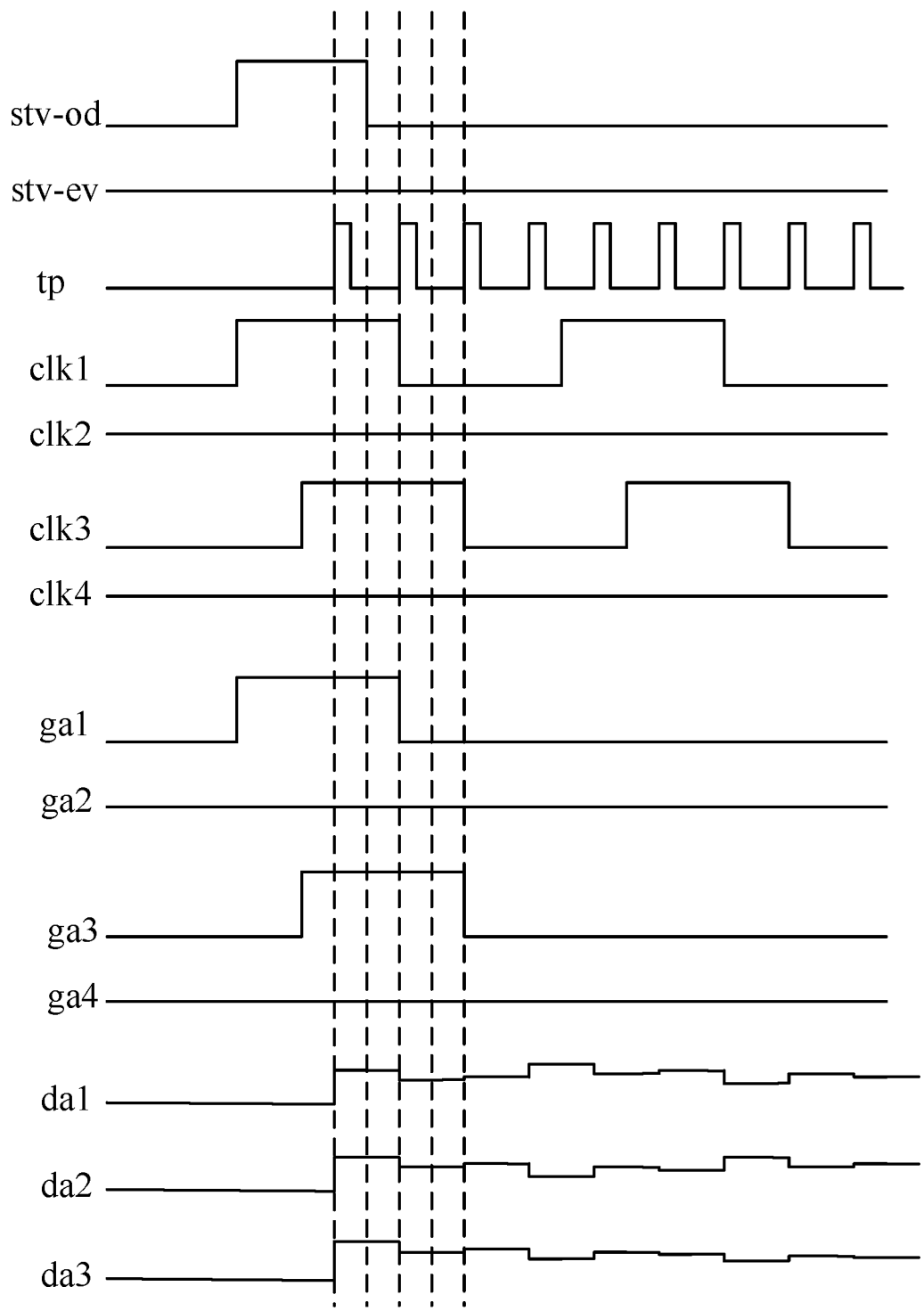
FIG. 6 shows some signal timing diagrams according to an embodiment of the present disclosure.
Figure 7:
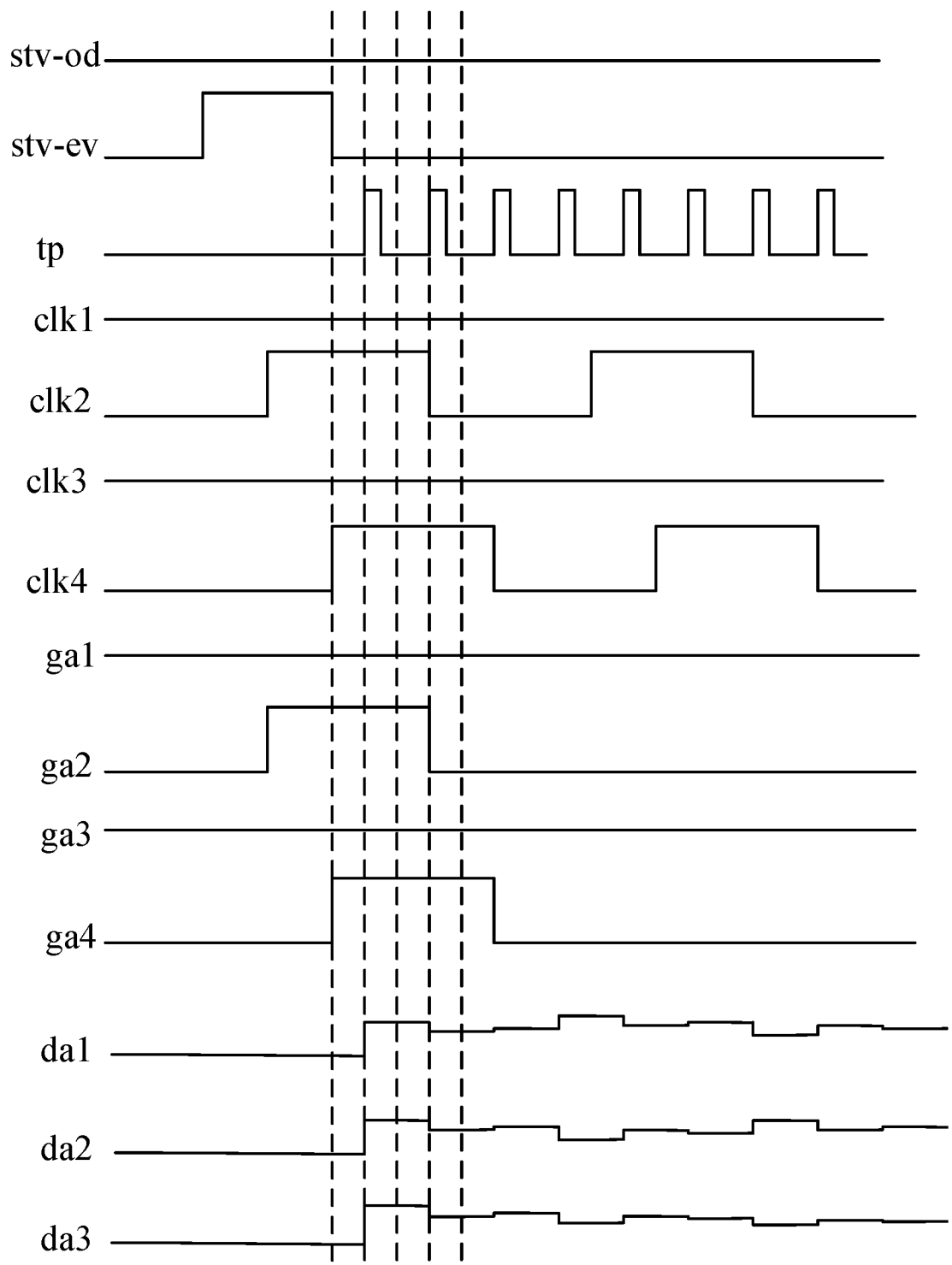
FIG. 7 shows some other signal timing diagrams according to an embodiment of the present disclosure.

In the embodiments of the present disclosure, the timing controller may switch a level of the driving enable pin OE_EN from a first level to a second level, as an active level of interlaced driving. And, the source driving circuit can compare a voltage corresponding to the level of the driving enable pin OE_EN with a stored set voltage threshold, and when the voltage corresponding to the level of the driving enable pin OE_EN is higher than the set voltage threshold, the interlaced data output signal (such as tp shown in FIG. 6 and FIG. 7) is generated. For example, if the active level of interlaced driving is a high level, the first level may be a low level and the second level may be a high level. H denotes the high level and L denotes the low level. Referring to FIG. 1A to FIG. 1C and FIG. 6 and FIG. 7, the display data of the second image and the condition for determining the defective image are input into a data comparison module to determine whether the second image is a defective image. When it is determined that the second image is the defective image, the driving enable pin OE_EN is set to a voltage corresponding to H, for example, when the driving enable pin OE_EN is pulled up from a voltage corresponding to L to the voltage corresponding to H, it may indicate that the driving enable pin OE_EN is the active level of interlaced driving. The source driving circuit can compare the voltage corresponding to H of the driving enable pin OE_EN with the stored set voltage threshold through a voltage comparator, and when the voltage corresponding to H is higher than the set voltage threshold, the source driving circuit can enabled the working mode corresponding to the interlaced data control signal, so that the source driving circuit outputs the display data to a buffer through a CDES receiver under the control of the interlaced data control signal, so as to output the display data to the data lines through the buffer, therefore, interlaced output of corresponding display data to the data lines of the display panel may be realized. Moreover, the timing controller further outputs an interlaced scanning control signal (such as stv-od, stv-ev as shown in FIG. 6 and FIG. 7) to the gate driving circuit through the level shift circuit to drive the gate lines in an interlaced manner, and then drive the display panel in an interlaced manner. Referring to FIG. 6 and FIG. 7, optionally, tp denotes the interlaced data output signal, signal tp may latch data at a rising edge and output data at a falling edge, or may be latch data at a falling edge and output data at a rising edge. The drawings only show latching the data at the rising edge, and outputting the data at the falling edge. It should be noted that the set voltage threshold can be determined according to the requirements of practical applications, and is not limited herein.

In the embodiments of the present disclosure, when the timing controller determines that the second image is not a defective image, it can control the display panel to scan and drive the sub-pixels row by row, and load the display data corresponding to each row of sub-pixels to each data line, so that each sub-pixel in the display panel performs data refreshing. Exemplarily, when the timing controller determines that the second image is not the defective image, a progressive scan control signal may be input to the gate driving circuit through the level shift circuit, and a progressive data control signal may be input to the source driving circuit, to control the display panel to scan and drive the sub-pixels row by row, and load the display data corresponding to each row of sub-pixels to each data line. For example, the active level of progressive driving is a low level, and when the source driving circuit detects that the level of the driving enable pin OE_EN is a low level, it can load the display data corresponding to each row of sub-pixels to each of the data lines. In this way, when the timing controller determines the second image is not the defective image, the progressive data control signal is input to the source driving circuit to enable the work mode corresponding to the progressive data control signal, so that the source driving circuit may drive the display panel accordingly. Furthermore, when displaying the second image, the sub-pixels can be driven row by row to display the image, thereby improving the display resolution.

Figure 8:
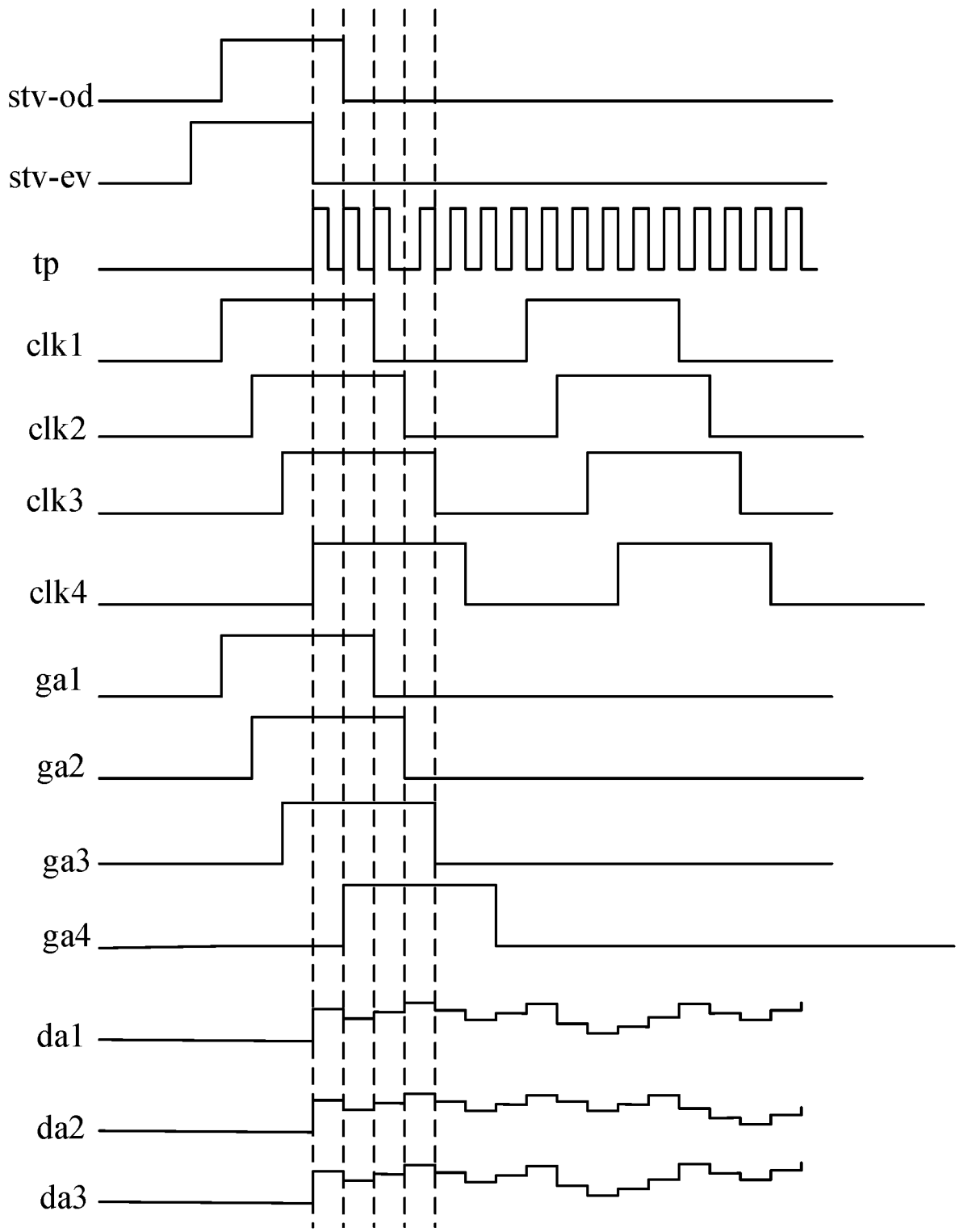
FIG. 8 shows still some other signal timing diagrams according to an embodiment of the present disclosure.

In the embodiments of the present disclosure, the timing controller may set the driving enable pin OE_EN of the GPIO interface to the active level of progressive driving, so as to be output as the progressive data control signal. And, the source driving circuit may generate a progressive data output signal (such as tp as shown in FIG. 8) when detecting that the level of the driving enable pin OE_EN is the active level of progressive driving, and according to the generated progressive data output signal, the display data corresponding to each row of sub-pixels is loaded to each of the data lines. For example, the active level of progressive driving is a low level, and when the source driving circuit detects that the level of the driving enable pin OE_EN is a low level, the progressive data output signal can be generated.

In the embodiments of the present disclosure, the timing controller may keep the level of the driving enable pin OE_EN at the first level, as the active level of progressive driving. And, the source driving circuit may generate the progressive data output signal when the voltage corresponding to the level of the driving enable pin OE_EN is not higher than the set voltage threshold. For example, if the active level of progressive driving is a low level, then the first level may be a low level. L denotes a high level. With reference to FIG. 1A to FIG. 1C and FIG. 8, the display data of the second image and the condition for determining the defective image are input into the data comparison module to determine whether the second image is a defective image. When it is determined that the second image is not a defective image, the driving enable pin OE_EN is set to a voltage corresponding to L, for example, the driving enable pin OE_EN may be held at a voltage corresponding to L, which can indicate that a progressive data control signal is output. The source driving circuit can compare the voltage corresponding to L of the driving enable pin OE_EN at this time with the stored set voltage threshold through the voltage comparator, and when the voltage corresponding to L is lower than the set voltage threshold, it may enable the work mode corresponding to the progressive data control signal in the source driving circuit, so that the source driving circuit may generate the progressive data output signal (such as tp as shown in FIG. 8). As such, the source driving circuit outputs the display data to a buffer through a CDES receiver under the control of the progressive data output signal, so as to output the display data to the data line through the buffer, thereby realizing interlaced output of corresponding display data to the data lines of the display panel. Furthermore, the timing controller also outputs a progressive scan control signal (such as stv-od, stv-ev shown in FIG. 8) to the gate driving circuit through the level shift circuit, so as to drive the gate lines row by row, and then drive the display panel.

Figure 3:
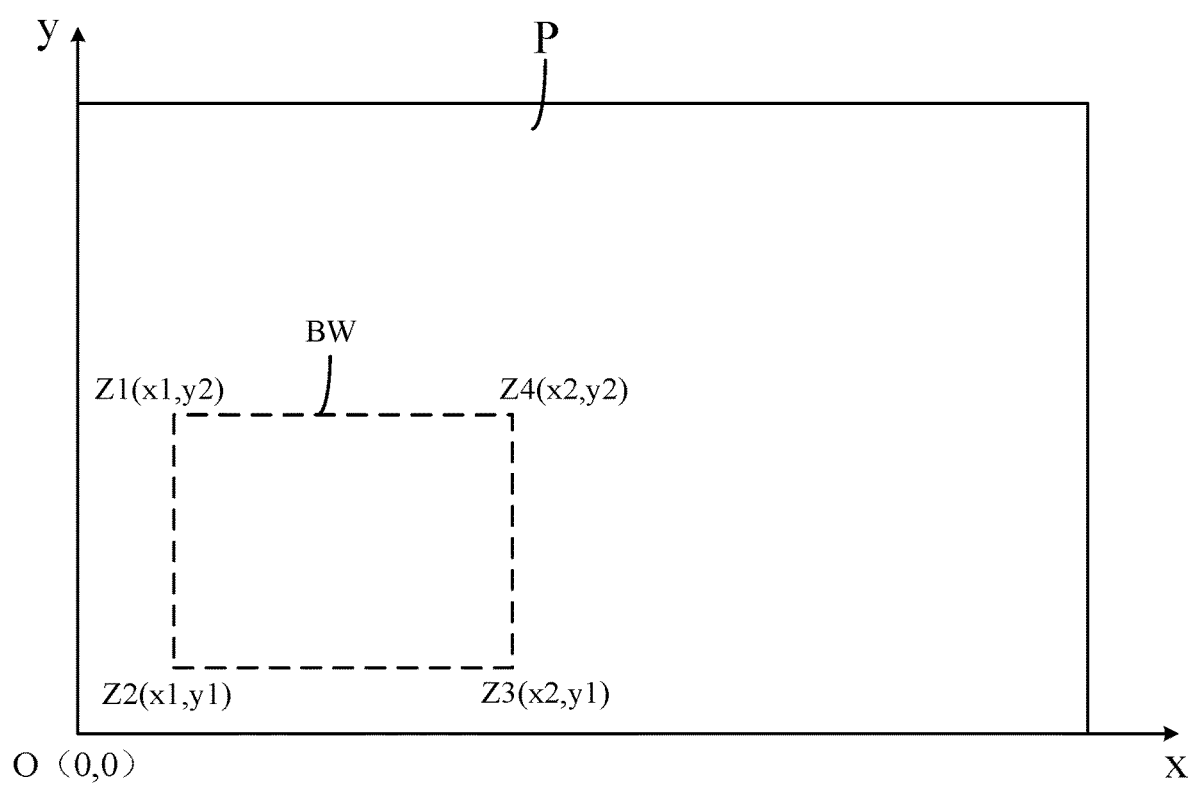
FIG. 3 is a schematic diagram of a defective region according to an embodiment of the present disclosure.

In the embodiments of the present disclosure, the condition for determining the defective image may be stored in the timing controller. Exemplarily, the condition for determining the defective image may include: a set area threshold of a defective region. Exemplarily, as shown in FIG. 3, P denotes an image displayed in the display panel, the lower left corner of the image P is taken as an origin O(0,0), the lower edge of the image P is taken as a horizontal axis x, and the left edge of the image P is taken as a longitudinal axis y. If the defective region BW may be a rectangle, the coordinates of the four top corners of the defective region BW are: a coordinate of the upper left corner Z1 (x1, y2), a coordinate of the lower left corner Z2 (x1, y1), a coordinate of the lower right corner Z3 (x2, y1), a coordinates of the upper right corner Z4(x2, y2). For example, if the resolution of the display panel is A column×B row, x1 and x2 may be selected from 0 to A according to the setting of x2>x1, and y1 and y2 may be selected from 0 to B according to the setting of y2>y1. For example, the resolution of an 8K display panel is 7680 columns×4320 rows, that is, A=7680, B=4320, then the x1 and x2 may be selected from 0-7680, and the y1 and y2 may be selected from 0-4320. For example, x1=0, x2=3840, y1=0, y2=2160. In this way, the area of the defective region in the image may be set to ¼ of the original image. Alternatively, it can also be said that x1, x2, y1 and y2 are selected from other values to make the area of the defective region in the image be set to be ¼ of the original image. Alternatively, it can also be said that x1, x2, y1 and y2 are selected from other values to make the area of the defective region in the image be set to ½ of the original image. Alternatively, it can also be said that x1, x2, y1 and y2 are selected from other values to make the area of the defective region in the image be set to ⅓ of the original image. Of course, in practical applications, the specific values selected for x1, x2, y1, and y2 may be determined according to requirements of practical applications, and are not limited herein.

In the embodiments of the present disclosure, the defective region may also be a circle, an ellipse, a polygon, etc., which is not limited herein.

In the embodiments of the present disclosure, the condition for determining a defective image may further include: a set gray scale difference threshold between gray scales of display data corresponding to two adjacent sub-pixels in the same column. Exemplarily, when the display panel uses 256 gray scales, the set gray scale difference threshold may be selected from 10-150 gray scales. For example, the set gray scale difference threshold may be the gray scale 150, the set gray scale difference threshold may be the gray scale 127, the set gray scale difference threshold may also be the gray scale 100, and the set gray scale difference threshold may also be the gray scale 80, the set gray scale difference threshold may also be the gray scale 63, the set gray scale difference threshold may also be the gray scale 50, and the set gray scale difference threshold may also be the gray scale 10. Of course, in practical applications, the set gray scale difference threshold may be determined according to the requirements of practical applications, which is not limited herein.

In the embodiments of the present disclosure, determining that the second image is the defective image may specifically include: determining a target region formed by sub-pixels corresponding to display data satisfying the set gray scale difference threshold in the display data of the second image, and when the target region satisfies a set area threshold, determining that the second image is the defective image. In this way, whether the second image is the defective image is determined by two conditions included in the condition for determining the defective image, which can improve the accuracy of determining that the second image is the defective image. Exemplarily, the target region formed by the sub-pixels corresponding to the display data that is not less than the set gray scale difference threshold in the display data of the second image is determined. When the target region is not smaller than the set area threshold, it is determined that the second image is the defective image. In this way, the sub-pixels corresponding to the display data that is not less than the set gray scale difference threshold can be preliminarily screened out to form the target region, and then by comparing the target region with the set area threshold, when the target region is not less than the set area threshold, it can be determined that the second image is the defective image, so that the accuracy of determining that the second image is the defective image may be improved.

For example, Sba is used to represent the position of each sub-pixel of the display panel, a and b are both integers, 1≤a≤A, 1≤b≤B. As shown in FIG. 4, taking A=12 and B=10 as an example, the sub-pixels in the first row to the tenth row in the first column are respectively S11-S101, and the sub-pixels in the first row to the tenth row in the second column are respectively S12-S102, the sub-pixels in the first row to the tenth row in the third column are respectively S13-S103, the sub-pixels in the first row to the tenth row in the fourth column are respectively S14-S104, and the sub-pixels in the first row to the tenth row in the fifth column are respectively S15-S105, the sub-pixels in the first row to the tenth row in the sixth column are respectively S16-S106, and the sub-pixels in the first row to the tenth row in the seventh column are respectively S17-S107, the sub-pixels in the first row to the tenth row in the eighth column are respectively S18-S108, the sub-pixels in the first row to the tenth row in the ninth column are respectively S19-S109, and the sub-pixels in the first row to the tenth row in the tenth column are respectively S110-S1010, the sub-pixels in the first row to the tenth row in the eleventh column are respectively S111-S1011, and the sub-pixels in the first row to the tenth row in the twelfth column are respectively S112-S1012.

In the first column, the difference between the gray scales of the display data corresponding to the sub-pixels S11 and S21 is less than the set gray scale difference threshold, the difference between the gray scales of the display data corresponding to the sub-pixels S31 and S41 is also less than the set gray scale difference threshold, the difference between the gray scales of the display data corresponding to the sub-pixels S51 and S61 is not less than the set gray scale difference threshold, the difference between the gray scales of the display data corresponding to the sub-pixels S71 and S81 is not less than the set gray scale difference threshold, and the difference between the gray scales of the display data corresponding to the sub-pixels S91 and S101 is not less than the set gray scale difference threshold.

And, in the second column, the difference between the gray scales of the display data corresponding to the sub-pixels S12 and S22 is less than the set gray scale difference threshold, the difference between the gray scales of the display data corresponding to the sub-pixels S32 and S42 is also less than the set gray scale difference threshold, the difference between the gray scales of the display data corresponding to the sub-pixels S52 and S62 is not less than the set gray scale difference threshold, the difference between the gray scales of display data corresponding to the sub-pixels S72 and S82 is not less than the set gray scale difference threshold, and the difference between the gray scales of the display data corresponding to the sub-pixels S92 and S102 is not less than the set gray scale difference threshold.

And, in the third column, the difference between the gray scales of the display data corresponding to the sub-pixels S13 and S23 is less than the set gray scale difference threshold, the difference between the gray scales of the display data corresponding to the sub-pixels S33 and S43 is also less than the set gray scale difference threshold, the difference between the gray scales of the display data corresponding to the sub-pixels S53 and S63 is not less than the set gray scale difference threshold, the difference between the gray scales of the display data corresponding to the sub-pixels S73 and S83 is not less than the set gray scale difference threshold, and the difference between the gray scales of the display data corresponding to the sub-pixels S93 and S103 is not less than the set gray scale difference threshold. In addition, in the fourth column to the twelfth column, the differences between the gray scales of the display data corresponding to the sub-pixels in two adjacent rows in the same column are all less than the set gray scale difference threshold.

Then the sub-pixels S51-S101 in the first column, the sub-pixels S52-S102 in the second column, and the sub-pixels S53-S103 in the third column form a target region M1. If an area of the target region M1 is not smaller than the set area threshold, the timing controller may determine that the second image is a defective image. If the area of the target region M1 is smaller than the set area threshold, the target region M1 may be too small and not easily perceived by human eyes, and the timing controller may determine that the second image is not a defective image.

In the embodiments of the present disclosure, determining the target region formed by sub-pixels corresponding to display data satisfying a set difference threshold in the display data of the second image, may specifically include: dividing pixel units in the display panel into a plurality of unit groups by taking at least one column of pixel units in at least two adjacent rows as a unit group; for display data corresponding to each unit group, a gray scale difference between gray scales of the display data corresponding to two adjacent rows of sub-pixels in the same column is determined; when the gray scale difference satisfies the set gray scale difference threshold, the unit group in which the sub-pixels corresponding to the gray scale difference satisfying the set gray scale difference threshold are located is defined as a target unit group, and all the target unit groups form a target region. In this way, by setting the unit group, at least two pixel units can be used as the minimum unit to filter the target region, thereby reducing the amount of calculation and power consumption.

Exemplarily, for example, a pixel unit includes three sub-pixels, and a column of pixel units in two adjacent rows is taken as a unit group. As shown in FIG. 5A, in the first column of pixel units, the sub-pixels S11, S12, S13, S21, S22, and S23 are used as the first unit group, and the sub-pixels S31, S32, S33, S41, S42, and S43 are used as the second unit group. The sub-pixels S51, S52, S53, S61, S62, and S63 are used as the third unit group. The sub-pixels S71, S72, S73, S81, S82, and S83 are used as the fourth unit group. The sub-pixels S91, S92, S93, S101, S102, and S103 are used as the fifth unit group. In the first unit group, if the difference between the gray scales of the display data corresponding to the sub-pixels S11 and S21, the difference between the gray scales of the display data corresponding to the sub-pixels S12 and S22, and the difference between the gray scales of the display data corresponding to the sub-pixels S13 and S23 are all less than the set gray scale difference threshold, then the first unit group does not need to be defined as a target unit group. Similarly, it is not necessary to define the second unit group as the target unit group. In the third unit group, if the gray scale corresponding to the sub-pixel S51 is greater than the gray scale corresponding to the sub-pixel S61, and the difference between the gray scales of the display data corresponding to the sub-pixels S51 and S61 is not less than the set gray scale difference threshold, if the gray scale corresponding to the sub-pixel S52 is greater than the gray scale corresponding to the sub-pixel S62, and the difference between the gray scales of the display data corresponding to the sub-pixels S52 and S62 is not less than the set gray scale difference threshold, and if the gray scale corresponding to the sub-pixel S53 is greater than the gray scale corresponding to the sub-pixel S63, and the difference between the gray scales of the display data corresponding to the sub-pixel S53 and S63 is not less than the set gray scale difference threshold, the third unit group can be defined as a target unit group. Similarly, the fourth unit group and the fifth unit group are defined as target unit groups.

And, in the second column of pixel units, the sub-pixels S14, S15, S16, S24, S25, S26 are used as the sixth unit group, and the sub-pixels S34, S35, S36, S44, S45, S46 are used as the seventh unit group, and the sub-pixels S54, S55, S56, S64, S65, and S66 are used as the eighth unit group. The sub-pixels S74, S75, S76, S84, S85, and S86 are used as the ninth unit group. The sub-pixels S94, S95, S96, S104, S105, and S106 are used as the tenth unit group. In the sixth unit group, if the difference between the gray scales of the display data corresponding to the sub-pixels S14 and S24, the difference between the gray scales of the display data corresponding to the sub-pixels S15 and S25, and the difference between the gray scales of the display data corresponding to the sub-pixels S16 and S26 are all less than the set gray scale difference threshold, then the sixth unit group does not need to be defined as a target unit group. Similarly, it is not necessary to define the seventh unit group as a target unit group. In the eighth unit group, if the gray scale corresponding to the sub-pixel S54 is less than the gray scale corresponding to the sub-pixel S64, and the difference between the gray scales of the display data corresponding to the sub-pixels S54 and S64 is not less than the set gray scale difference threshold, if the gray scale corresponding to the sub-pixel S55 is less than the grayscale corresponding to the sub-pixel S65, and the difference between the gray scales of the display data corresponding to the sub-pixels S55 and S65 is not less than the set gray scale difference threshold, and if the gray scale corresponding to the sub-pixel S56 is less than the gray scale corresponding to the sub-pixel S66, and the difference between the gray scales of the display data corresponding to the sub-pixel S56 and S66 is not less than the set gray scale difference threshold, the eighth unit group may be defined as a target unit group. Similarly, the ninth unit group and the tenth unit group are defined as target unit groups.

And, in the third column of pixel units, the sub-pixels S17, S18, S19, S27, S28, and S29 are used as the eleventh unit group, and the sub-pixels S37, S38, S39, S47, S48, and S49 are used as the twelfth unit group. The sub-pixels S57, S58, S59, S67, S68, and S69 are used as the thirteenth unit group. The sub-pixels S77, S78, S79, S87, S88, and S89 are used as the fourteenth unit group. The sub-pixels S97, S98, S99, S107, S108, and S109 are used as the fifteenth unit group. In the eleventh unit group, if the difference between the gray scales of the display data corresponding to the sub-pixels S17 and S27, the difference between the gray scales of the display data corresponding to the sub-pixels S18 and S28, and the difference between the gray scales of the display data corresponding to the sub-pixels S19 and S29 are all less than the set gray scale difference threshold, it is not necessary to define the eleventh unit group as a target unit group. Similarly, it is not necessary to define the twelfth unit group as a target unit group. In the thirteenth unit group, if the gray scale corresponding to the sub-pixel S57 is greater than the gray scale corresponding to the sub-pixel S67, and the difference between the gray scales of the display data corresponding to the sub-pixels S57 and S67 is not less than the set gray scale difference threshold, if the gray scale corresponding to the sub-pixel S58 is greater than the gray scale corresponding to the sub-pixel S68, and the difference between the gray scales of the display data corresponding to the sub-pixels S58 and S68 is not less than the set gray scale difference threshold, and if the gray scale corresponding to the sub-pixel S59 is greater than the gray scale corresponding to the sub-pixel S69, and the difference between the gray scales of the display data corresponding to the sub-pixels S59 and S69 is not less than the set gray scale difference threshold, the thirteenth unit group is defined as a target unit group. Similarly, the fourteenth unit group and the fifteenth unit group may be defined as target unit groups to form the target region M1. Moreover, the rest of the unit groups need not be defined as target unit groups.

Exemplarily, as shown in FIG. 5B, in the first column of pixel units, the sub-pixels S11, S12, S13, S21, S22, and S23 are used as the first unit group, and the sub-pixels S31, S32, S33, S41, S42, and S43 are used as the second unit group. The sub-pixels S51, S52, S53, S61, S62, and S63 are used as the third unit group. The sub-pixels S71, S72, S73, S81, S82, and S83 are used as the fourth unit group. The sub-pixels S91, S92, S93, S101, S102, and S103 are used as the fifth unit group. In the second column of pixel units, the sub-pixels S14, S15, S16, S24, S25, and S26 are used as the sixth unit group, and the sub-pixels S34, S35, S36, S44, S45, and S46 are used as the seventh unit group. The sub-pixels S54, S55, S56, S64, S65, and S66 are used as the eighth unit group. The sub-pixels S74, S75, S76, S84, S85, and S86 are used as the ninth unit group. The sub-pixels S94, S95, S96, S104, S105, and S106 are used as the tenth unit group. In the third column of pixel units, the sub-pixels S17, S18, S19, S27, S28, S29 are used as the eleventh unit group, and the sub-pixels S37, S38, S39, S47, S48, S49 are used as the twelfth unit group. The sub-pixels S57, S58, S59, S67, S68, and S69 are used as the thirteenth unit group. The sub-pixels S77, S78, S79, S87, S88, and S89 are used as the fourteenth unit group. The sub-pixels S97, S98, S99, S107, S108, and S109 are used as the fifteenth unit group. The division of the remaining unit groups may be obtained in the same way. In the third unit group, if the gray scale corresponding to the sub-pixel S51 is greater than the gray scale corresponding to the sub-pixel S61, and the difference between the gray scales of the display data corresponding to the sub-pixels S51 and S61 is not less than the set gray scale difference threshold, if the difference between the gray scales of the display data corresponding to the sub-pixels S52 and S62 is less than the set gray scale difference threshold, and if the difference between the gray scales of the display data corresponding to the sub-pixels S53 and S63 is smaller than the set gray scale difference threshold, the third unit group may be defined as a target unit group. Similarly, the fourth unit group and the fifth unit group are defined as target unit groups. Similarly, the eighth unit group, the ninth unit group, the tenth unit group, the thirteenth unit group, the fourteenth unit group and the fifteenth unit group are defined as target unit groups to form the target region M1.

Exemplarily, as shown in FIG. 5C, in the first column of pixel units, the sub-pixels S11, S12, S13, S21, S22, and S23 are used as the first unit group, and the sub-pixels S31, S32, S33, S41, S42, and S43 are used as the second unit group. The sub-pixels S51, S52, S53, S61, S62, and S63 are used as the third unit group. The sub-pixels S71, S72, S73, S81, S82, and S83 are used as the fourth unit group. The sub-pixels S91, S92, S93, S101, S102, and S103 are used as the fifth unit group. In the second column of pixel units, the sub-pixels S14, S15, S16, S24, S25, and S26 are used as the sixth unit group, and the sub-pixels S34, S35, S36, S44, S45, and S46 are used as the seventh unit group. The sub-pixels S54, S55, S56, S64, S65, and S66 are used as the eighth unit group. The sub-pixels S74, S75, S76, S84, S85, and S86 are used as the ninth unit group. The sub-pixels S94, S95, S96, S104, S105, and S106 are used as the tenth unit group. In the third column of pixel units, the sub-pixels S17, S18, S19, S27, S28, S29 are used as the eleventh unit group, and the sub-pixels S37, S38, S39, S47, S48, S49 are used as the twelfth unit group. The sub-pixels S57, S58, S59, S67, S68, and S69 are used as the thirteenth unit group. The sub-pixels S77, S78, S79, S87, S88, and S89 are used as the fourteenth unit group. The sub-pixels S97, S98, S99, S107, S108, and S109 are used as the fifteenth unit group. The division of the remaining unit groups can be obtained in the same way. In the third unit group, if the gray scale corresponding to the sub-pixel S51 is greater than the gray scale corresponding to the sub-pixel S61, and the difference between the gray scales of the display data corresponding to the sub-pixels S51 and S61 is not less than the set gray scale difference threshold, if the gray scale corresponding to the sub-pixel S52 is greater than the gray scale corresponding to the sub-pixel S62, and the difference between the gray scales of the display data corresponding to the sub-pixels S52 and S62 is not less than the set gray scale difference threshold, and if the gray scale corresponding to the sub-pixel S53 is greater than the gray scale corresponding to the sub-pixel S63, and the difference between the gray scales of the display data corresponding to the sub-pixel S53 and S63 is not less than the set gray scale difference threshold, then the third unit group may be defined as a target unit groups. Similarly, the fourth unit group and the fifth unit group are defined as target unit groups. Similarly, the eighth unit group, the ninth unit group, the tenth unit group, the thirteenth unit group, the fourteenth unit group and the fifteenth unit group are defined as target unit groups to form the target region M1.

Exemplarily, as shown in FIG. 5D, in the first column of pixel units, the sub-pixels S11, S12, S13, S21, S22, and S23 are used as the first unit group, and the sub-pixels S31, S32, S33, S41, S42, and S43 are used as the second unit group. The sub-pixels S51, S52, S53, S61, S62, and S63 are used as the third unit group. The sub-pixels S71, S72, S73, S81, S82, and S83 are used as the fourth unit group. The sub-pixels S91, S92, S93, S101, S102, and S103 are used as the fifth unit group. In the second column of pixel units, the sub-pixels S14, S15, S16, S24, S25, and S26 are used as the sixth unit group, and the sub-pixels S34, S35, S36, S44, S45, and S46 are used as the seventh unit group. The sub-pixels S54, S55, S56, S64, S65, and S66 are used as the eighth unit group. The sub-pixels S74, S75, S76, S84, S85, and S86 are used as the ninth unit group. The sub-pixels S94, S95, S96, S104, S105, and S106 are used as the tenth unit group. In the third column of pixel units, the sub-pixels S17, S18, S19, S27, S28, and S29 are used as the eleventh unit group, and the sub-pixels S37, S38, S39, S47, S48, and S49 are used as the twelfth unit group. The sub-pixels S57, S58, S59, S67, S68, and S69 are used as the thirteenth unit group. The sub-pixels S77, S78, S79, S87, S88, and S89 are used as the fourteenth unit group. The sub-pixels S97, S98, S99, S107, S108, and S109 are used as the fifteenth unit group. The division of the remaining unit groups may be obtained in the same way.

In the third unit group, if the gray scale corresponding to the sub-pixel S51 is greater than the gray scale corresponding to the sub-pixel S61, and the difference between the gray scales of the display data corresponding to the sub-pixels S51 and S61 is not less than the set gray scale difference threshold, if the difference between the gray scales of the display data corresponding to the sub-pixels S52 and S62 is less than the set gray scale difference threshold, and if the difference between the gray scales of the display data corresponding to the sub-pixels S53 and S63 is less than the set gray scale difference threshold, the third unit group can be defined as a target unit group. Similarly, the fourth unit group and the fifth unit group are defined as target unit groups. Similarly, the eighth unit group, the ninth unit group, the tenth unit group, the thirteenth unit group, the fourteenth unit group and the fifteenth unit group are defined as target unit groups to form the target region M1.

Exemplarily, for example, a pixel unit includes three sub-pixels, and a column of pixel units in four adjacent rows is taken as a unit group. As shown in FIG. 5E, in the first column of pixel units, the sub-pixels S11, S12, S13, S21, S22, S23, S31, S32, S33, S41, S42, and S43 are used as the first unit group, and the sub-pixels S51, S52, S53, S61, S62, S63, S71, S72, S73, S81, S82, and S83 are used as the second unit group. The sub-pixels S91, S92, S93, S101, S102, S103, S111, S112, S113, S121, S122, and S123 are used as the third unit group. In the second column of pixel units, the sub-pixels S14, S15, S16, S24, S25, S26, S34, S35, S36, S44, S45, and S46 are used as the fourth unit group, and the sub-pixels S54, S55, S56, S64, S65, S66, S74, S75, S76, S84, S85, and S86 are used as the fifth unit group. The sub-pixels S94, S95, S96, S104, S105, S106, S114, S115, S116, S124, S125, and S126 are used as the sixth unit group. In the third column of pixel units, the sub-pixels S17, S18, S19, S27, S28, S29, S37, S38, S39, S47, S48, and S49 are used as the seventh unit group, and the sub-pixels S57, S58, S59, S67, S68, S69, S77, S78, S79, S87, S88, and S89 are used as the eighth unit group. The sub-pixels S97, S98, S99, S107, S108, S109, S117, S118, S119, S127, S128, and S129 are used as the ninth unit group. The division of the remaining unit groups is obtained in the same way. The first unit group, the second unit group, the fourth unit group, the fifth unit group, the seventh unit group, and the eighth unit group can be defined as target unit groups according to the above rules to form the target region M1.

It should be noted that, in FIG. 5A to FIG. 5E, sub-pixels with a higher gray scale in the target region M1 are marked by hatching.

In the embodiments of the present disclosure, the target region M1 is formed by the target unit groups. Afterwards, the area of the target region M1 may be compared with the set area threshold, and if the area of the target region M1 is not smaller than the set area threshold, it is determined that the second image is a defective image. If the area of the target region M1 is smaller than the set area threshold, the target region M1 may be too small to be easily perceived by human eyes, and it may be determined that the second image is not a defective image. In this way, the sub-pixels of the display panel can be controlled to scan and drive row by row, and the display data of the second image can be loaded to each data line, so that each sub-pixel in the display panel can perform data refreshing.

In the embodiments of the present disclosure, in the current display frame, it is determined whether the second frame is a defective image according to the display data of the second image and the condition for determining the defective image. In a display frame following the current display frame, the display panel may be controlled to perform scanning and driving at least one row of sub-pixels apart, and in the two rows of sub-pixels that are scanned and driven, when the first row of sub-pixels has been driven and the second row of sub-pixels is in the process of being driven, the data lines connected with the second row of sub-pixels are loaded with the display data of the second image. In practical applications, the display panel may be controlled to scan and drive the sub-pixels row by row in the current display frame, and the display data of the second image can be loaded to each data line, so that each sub-pixel in the display panel can perform data refreshing. That is, in the current display frame, each row of sub-pixels is controlled to be turned on normally, and the timing controller needs time of one display frame to determine whether the second frame is a defective image, so that it can determine whether the second image is a defective image in the current display frame, after the determination is completed, in the display frame that appears after the current display frame in the display frame used to display the second frame, some rows of sub-pixels may be controlled to be turned on, and some rows of sub-pixels shall be in a black state. In this way, the image display and the determination process can be performed at the same time, without making the determination process take up extra time.

In the embodiments of the present disclosure, the timing controller can determine whether the second image is a defective image in the first display frame in which the second image is displayed, and perform interlaced driving in the second display frame in which the second image is displayed and in display frames after the second display frame. For example, in a video, images may be displayed through successive display frames. Here, the first image is displayed in the first display frame of the video, the first image is also displayed in the second display frame, the first image is also displayed in the third display frame, and the second image is displayed in the fourth display frame, the second image is also displayed in the fifth display frame, the second image is also displayed in the sixth display frame, the second image is also displayed in the seventh display frame, the second image is also displayed in the eighth display frame, etc. In this way, the timing controller may determine whether the second image is a defective image in the fourth display frame, and perform interlaced driving in the fifth display frame, the sixth display frame, the seventh display frame, and the eighth display frame.

In the embodiments of the present disclosure, the display panel may be controlled to perform scanning and driving one row of sub-pixels apart, or the display panel may be controlled to perform scanning and driving two rows of sub-pixels apart. For example, the sub-pixels in an odd-numbered row(s) are controlled to perform scanning and driving within a display frame. Then the first row of sub-pixels and the third row of sub-pixels may be used as two rows of sub-pixels for scanning and driving, at this time, when the first row of sub-pixels has been driven and the second row of sub-pixels is in the process of being driven, the data lines connected with the second row of sub-pixels are loaded with the display data corresponding to the second row of sub-pixels. The third row of sub-pixels and the fifth row of sub-pixels may be used as two rows of sub-pixels for scanning and driving, at this time, when the third row of sub-pixels has been driven and the fifth row of sub-pixels is being driven, the data lines connected with the fifth row of sub-pixels are loaded with the display data corresponding to the fifth row of sub-pixels. The fifth row of sub-pixels and the seventh row of sub-pixels may be used as two rows of sub-pixels for scanning and driving, when the fifth row of sub-pixels has been driven and the seventh row of sub-pixels is being driven, the data lines connected with the seventh row of sub-pixels are loaded with the display data corresponding to the seventh row of sub-pixels. The rest can be deduced in the same way, and will not be repeated herein.

For example, the sub-pixels in an even-numbered row(s) are controlled to perform scanning and driving in one display frame. Then the second row of sub-pixels and the fourth row of sub-pixels of may be used as two rows of sub-pixels for scanning and driving, when the second row of sub-pixels has been driven and the fourth row of sub-pixels is being driven, the data lines connected with the fourth row of sub-pixels are loaded with the display data corresponding to the fourth row of sub-pixels. The fourth row of sub-pixels and the sixth row of sub-pixels may be used as two rows of sub-pixels for scanning and driving, when the fourth row of sub-pixels has been driven and the sixth row of sub-pixels is in the process of being driven, the data lines connected with the sixth row of sub-pixels are loaded with the display data corresponding to the sixth row of sub-pixels. The sixth row of sub-pixels and the eighth row of sub-pixels may be used as two rows of sub-pixels for scanning and driving. At this time, when the sixth row of sub-pixels has been driven and the eighth row of sub-pixels is in the process of being driven, the data lines connected with the sub-pixels of the eighth row are loaded with the display data corresponding to the eighth row of sub-pixels. The rest can be deduced in the same way, and will not be repeated herein.

In the embodiments of the present disclosure, the display panel may also be controlled to perform scanning and driving three rows of the sub-pixels apart. In the embodiments of the present disclosure, for example, when the first row of sub-pixels, the fourth row of sub-pixels, and the seventh row of sub-pixels are controlled to perform scanning and driving in one display frame. Then the first row of sub-pixels and the fourth row of sub-pixels may be used as two rows of sub-pixels for scanning and driving, at this time, when the first row of sub-pixels has been driven and the fourth row of sub-pixels is in the process of being driven, the data lines connected with the fourth row of sub-pixels are loaded with the display data corresponding to the fourth row of sub-pixels. The fourth row of sub-pixels and the seventh row of sub-pixels may be used as two rows of sub-pixels for scan driving, at this time, when the fourth row of sub-pixels has been driven and the seventh row of sub-pixels is in the process of being driven, the data lines connected with the seventh row of sub-pixels are loaded with the display data corresponding to the seventh row of sub-pixels in. The rest can be deduced in the same way, and will not be repeated herein.

In the embodiments of the present disclosure, the display panel may also be controlled to perform scanning and driving four rows of sub-pixels apart, or the display panel may be controlled to perform scanning and driving five rows of sub-pixels or more rows of sub-pixels apart, which is not limited herein.

Combining FIG. 1A with FIG. 6, FIG. 6 schematically shows a schematic diagram of signals in the first display frame after the current display frame when the second image is determined to be a defective image. In the embodiments of the present disclosure, when it is determined that the second image is a defective image, sub-pixels in an odd-numbered row(s) of the display panel may be controlled to perform scanning and driving in the odd-numbered display frame after the current display frame, and the display data corresponding to the sub-pixels in the odd-numbered row(s) may be output to each data line. Exemplarily, in the odd-numbered display frame after the current display frame, the timing controller may input an interlaced scanning control signal (such as stv-od, stv-ev, clk1, clk2, clk3, clk4) to the gate driving circuit of the display panel through the level shift circuit to control the gate driving circuit to scan and drive the sub-pixels in the odd-numbered row(s) of the display panel (for example, a signal ga1 is output to the gate line GA1 coupled to the first row of sub-pixels, and a signal ga2 is output to the gate line GA2 coupled to the second row of sub-pixels, and a signal ga3 is output to the gate line GA3 coupled to the third row of sub-pixels, and a signal ga4 is output to the gate line GA4 coupled to the fourth row of sub-pixels). And, the timing controller may input an interlaced data control signal to the source driving circuit in the display panel in the odd-numbered display frame after the current display frame, so that the source driving circuit generates an interlaced data output signal (such as signal tp), to output the display data corresponding to the sub-pixels of the odd-numbered row(s) to each data line (for example, the source driving circuit is triggered by the rising edge of the signal tp, and may output the display data corresponding to a row of sub-pixels.) For example, when a clock signal (CLK) input to the first row, third row, fifth row, and other odd-numbered rows is at a valid level, then the gate lines corresponding to the first row, third row, fifth row and other odd rows are opened. At this time, an overlap of the display data and clock signals is 2H under the control of the data control signal TP, and H represents the charging time of a row of pixels. This setting is equivalent to blanking out the data of the even-numbered row(s), charging each odd-numbered row for 2H, which can ensure a more sufficient charging rate. Of course, the overlap of the display data and the clock signal may be greater than 2H, and it can be set according to actual needs, as long as the display panel has sufficient charging rate.

For example, combining with FIG. 6, a high level of the signal ga1 controls the transistors 01 in the first row of sub-pixels to be turned on, and a low level of the signal ga1 controls the transistors 01 in the first row of sub-pixels to be turned off. A high level of the signal ga3 controls the transistors 01 in the third row of sub-pixels to be turned on, and a low level of the signal ga3 controls the transistors 01 in the third row of sub-pixels to be turned off. And, the signal ga2 is at a low level in the first display frame, so as to control the transistors 01 in the second row of sub-pixels to be turned off in the first display frame. Moreover, the signal ga4 is at a low level in the first display frame, so as to control the transistors 01 in the fourth row of sub-pixels to be turned off in the first display frame.

And, triggered by the first rising edge of the control signal tp, the display data corresponding to each sub-pixel in the first row is output, for example, the display data da1 of the first row and the first column is output to the data line DA1, so that corresponding display data is input to sub-pixels in the first row and the first column. The display data da2 of the first row and the second column is output to the data line DA2, so that corresponding display data is input to sub-pixels in the first row and the second column. The display data da3 of the first row and the third column is output to the data line DA3, so that corresponding display data is input to sub-pixels in the first row and the third column.

And, triggered by the second rising edge of the control signal tp, the display data corresponding to each sub-pixel in the third row is output, for example, the display data da1 of the third row and the first column is output to the data line DA1, so that corresponding display data is input to sub-pixels in the third row and the first column. The display data da2 of the third row and the second column is output to the data line DA2, so that corresponding display data is input to sub-pixels in the third row and the second column. The display data da3 of the third row and the third column is output to the data line DA3, so that corresponding display data is input to sub-pixels in the third row and the third column.

The driving processes corresponding to the remaining odd-numbered rows may be deduced by analogy, and will not be repeated here.

Moreover, the work processes corresponding to the third display frame and the fifth display frame after the current display frame are basically the same, and will not be repeated herein.

Combining FIG. 1A with FIG. 7, FIG. 7 schematically shows a schematic diagram of signals in a second display frame after the current display frame when the second image is determined to be a defective image. In the embodiments of the present disclosure, when it is determined that the second image is a defective image, the sub-pixels in the even-numbered row(s) of the display panel may be controlled to be scanned and driven in the even-numbered display frame after the current display frame, and the display data corresponding to the even-numbered row(s) of sub-pixels is output for each data line. Exemplarily, in the even-numbered display frame after the current display frame, the timing controller may input an interlaced scanning control signal (such as stv-od, stv-ev, clk1, clk2, clk3, clk4 etc.) to the gate driving circuit of the display panel to control the gate driving circuit to scan and drive the sub-pixels in the even-numbered row(s) of the display panel (for example, the gate line GA1 coupled to the first row of sub-pixels outputs a signal ga1, and the gate line GA2 coupled to the second row of sub-pixels outputs a signal ga2, the gate line GA3 coupled to the third row of sub-pixels outputs a signal ga3, and the gate line GA4 coupled to the fourth row of sub-pixels outputs a signal ga4). And, the timing controller may input an interlaced data control signal to the source driving circuit in the display panel in the even-numbered display frame after the current display frame, so that the source driving circuit may generate an interlaced data output signal (such as the signal tp), so as to output the display data corresponding to the sub-pixels in the even-numbered row(s) for each data line. (For example, the source driving circuit is triggered by the rising edge of the signal tp, and may output the display data corresponding to a row of sub-pixels.) For example, when a clock signal (CLK) input to the second row, the fourth row, the sixth row and other even-numbered rows is at a valid level, the gate lines of the second row, the fourth row, the sixth row and other even-numbered rows are opened. At this time, an overlap of the display data and the clock signal is 2H under the control of the data control signal TP, and H represents a charging time of a row of pixels. This setting is equivalent to blanking out the data of odd-numbered lines, charging each even-numbered line for 2H, which can ensure that the charging rate of each line is more sufficient. Of course, the overlap between the display data and the clock signal may be greater than 2H, and it can be set according to actual needs, as long as the display panel has a sufficient charge rate.

For example, referring to FIG. 7, a high level of the signal ga2 controls the transistors 01 in the second row of sub-pixels to be turned on, and a low level of the signal ga2 controls the transistors 01 in the second row of sub-pixels to be turned off. A high level of the signal ga4 controls the transistors 01 in the fourth row of sub-pixels to be turned on, and a low level of the signal ga4 controls the transistors 01 in the fourth row of sub-pixels to be turned off. And, the signal ga1 is at a low level in the second display frame, so as to control the transistors 01 in the first row of sub-pixels to be turned off in the second display frame. Moreover, the signal ga3 is at a low level in the second display frame, so as to control the transistors 01 in the sub-pixels in the third row to be turned off in the second display frame.

And, triggered by the first rising edge of the control signal tp, the display data corresponding to each sub-pixel in the second row is output, for example, the display data da1 of the second row and the first column is output to the data line DA1, so that the corresponding display data is input to a sub-pixel in the second row and the first column. The display data da2 of the second row and the second column is output to the data line DA2, so that the corresponding display data is input to a sub-pixel in the second row and the second column. The display data da3 of the second row and the third column is output to the data line DA3, so that the corresponding display data is input to a sub-pixel in the second row and the third column.

And, triggered by the second rising edge of the control signal tp, the display data corresponding to each sub-pixel in the fourth row is output, for example, the display data da1 of the fourth row and the first column is output to the data line DA1, so that the corresponding display data is input to a sub-pixel in the fourth row and first column. The display data da2 of the fourth row and the second column is output to the data line DA2, so that the corresponding display data is input to a sub-pixel in the fourth row and the second column. The display data da3 of the fourth row and the third column is output to the data line DA3, so that the corresponding display data is input to a sub-pixel in the fourth row and the third column.

The driving processes corresponding to the remaining even-numbered rows can be deduced by analogy, will not be repeated herein.

Moreover, the work processes corresponding to the fourth display frame and the sixth display frame, etc., after the current display frame are basically the same, and will not be repeated herein.

Combining FIG. 1A with FIG. 8, FIG. 8 schematically shows a schematic diagram of signals in the first display frame after the current display frame when it is determined that the second image is not a defective image. In the embodiments of the present disclosure, when it is determined that the second image is not a defective image, the timing controller may input a progressive scanning control signal (such as stv-od, stv-ev, clk1, clk2, clk3, clk4) through the level shift circuit in each display frame after the current display frame, to control the gate driving circuit to scan and drive each row of sub-pixels of the display panel (for example, the gate line GA1 coupled to the first row of sub-pixels outputs a signal ga1, the gate line GA2 coupled to the second row of sub-pixels outputs a signal ga2, the gate line GA3 coupled to the third row of sub-pixels outputs a signal ga3, and the gate line GA4 coupled to the fourth row of sub-pixels outputs a signal ga4). And, the timing controller may input a progressive data control signal to the source driving circuit in the display panel in each display frame after the current display frame, so that the source driving circuit generates a progressive data output signal (such as the signal tp) to output the display data corresponding to each row of sub-pixels for each data line. (For example, the source driving circuit is triggered by the rising edge of the signal tp, and may output the display data corresponding to a row of sub-pixels.).

For example, combining with FIG. 8, a high level of the signal ga1 controls the transistors 01 in the first row of sub-pixels to be turned on, and a low level of the signal ga1 controls the transistors 01 in the first row of sub-pixels to be turned off. A high level of the signal ga2 controls the transistors 01 in the second row of sub-pixels to be turned on, and a low level of the signal ga2 controls the transistors 01 in the second row of sub-pixels to be turned off. A high level of the signal ga3 controls the transistors 01 in the third row of sub-pixels to be turned on, and a low level of the signal ga3 controls the transistors 01 of the third row of sub-pixels to be turned off. A high level of the signal ga4 controls the transistors 01 in the fourth row of sub-pixels to be turned on, and a low level of the signal ga4 controls the transistors 01 in the fourth row of sub-pixels to be turned off.

And, triggered by the first rising edge of the control signal tp, the display data corresponding to each sub-pixel in the first row is output, for example, the display data da1 in the first row and the first column is output to the data line DA1, so that corresponding display data is input to a sub-pixel in the first row and the first column. The display data da2 of the first row and the second column is output to the data line DA2, so that corresponding display data is input to a sub-pixel in the first row and the second column. The display data da3 of the first row and the third column is output to the data line DA3, so that the corresponding display data is input to a sub-pixel in the first row and the third column.

And, triggered by the second rising edge of the control signal tp, the display data corresponding to each sub-pixel in the second row is output, for example, the display data da1 of the second row and the first column is output to the data line DA1, so that corresponding display data is input to a sub-pixel in the second row and the first column. The display data da2 of the second row and the second column is output to the data line DA2, so that corresponding display data is input to a sub-pixel in the second row and the second column. The display data da3 of the second row and the third column is output to the data line DA3, so that corresponding display data is input to a sub-pixel in the second row and the third column.

And, triggered by the third rising edge of the control signal tp, the display data corresponding to each sub-pixel in the third row is output, for example, the display data da1 of the third row and the first column is output to the data line DA1, so that corresponding display data is input to a sub-pixel in the third row and the first column. The display data da2 of the third row and the second column is output to the data line DA2, so that corresponding display data is input to a sub-pixel in the third row and the second column. The display data da3 of the third row and third column is output to the data line DA3, so that corresponding display data is input to a sub-pixel in the third row and third column.

And, triggered by the fourth rising edge of the control signal tp, the display data corresponding to each sub-pixel in the fourth row is output, for example, the display data da1 of the fourth row and the first column is output to the data line DA1, so that corresponding display data is input to a sub-pixel in the fourth row and the first column. The display data da1 of the fourth row and the second column is output to the data line DA2, so that corresponding display data is input to a sub-pixel in the fourth row and the second column. The display data da3 of the fourth row and the third column is output to the data line DA3, so that corresponding display data is input to a sub-pixel in the fourth row and the third column.

The driving processes corresponding to the remaining rows may be deduced by analogy, and will not be repeated herein.

Moreover, the work processes corresponding to the second display frame, the third display frame, and the fourth display frame, etc., after the current display frame are basically the same, and will not be repeated herein.

The embodiments of the present disclosure provide some other methods for driving the display panel, which are modified with respect to the implementation manners in the above-mentioned embodiments. The following only describes the differences between this embodiment and the above-mentioned embodiments, and the similarities will not be repeated herein.

Figure 9:
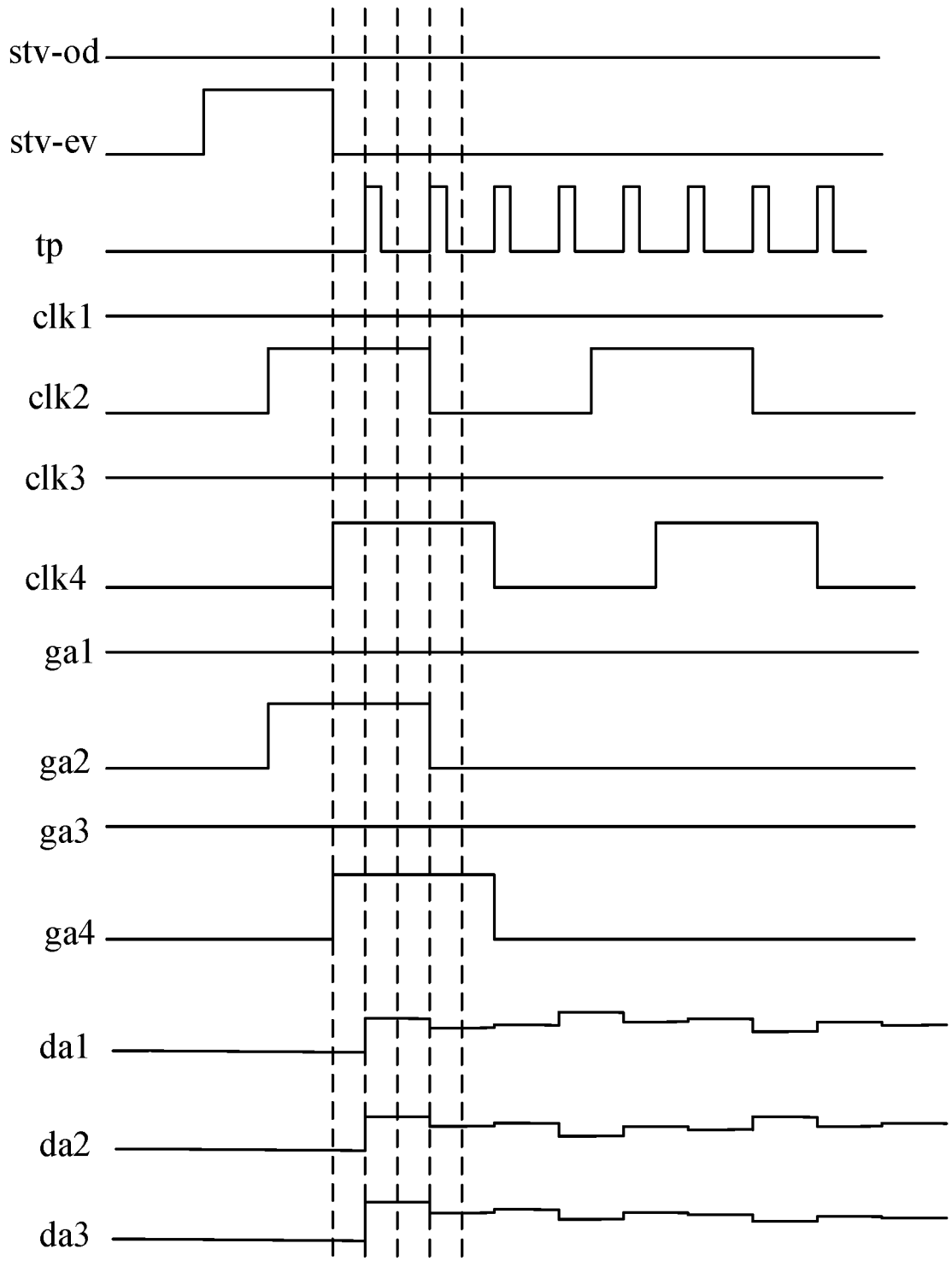
FIG. 9 shows still some other signal timing diagrams according to an embodiment of the present disclosure.

In the embodiments of the present disclosure, with reference to FIG. 1A and FIG. 9, FIG. 9 shows a schematic diagram of signals in a first display frame after the current display frame when the second image is determined to be a defective image. In the embodiments of the present disclosure, when it is determined that the second image is a defective image, the sub-pixels in the even-numbered row(s) of the display panel may be controlled to be scanned and driven, in the odd-numbered display frame after the current display frame, and display data corresponding to the sub-pixels in the even-numbered row(s) is output to each data line. Exemplarily, in the odd-numbered display frame after the current display frame, the timing controller may input an interlaced scanning control signal (such as stv-od, stv-ev, clk1, clk2, clk3, clk4) to the gate driving circuit through the level shift circuit to control the gate driving circuit to scan and drive the sub-pixels in the even-numbered row(s) of the display panel (for example, a signal ga1 is output to the gate line GA1 coupled to the first row of sub-pixels, a signal ga2 is output to the gate line GA2 coupled to the second row of the sub-pixels, a signal ga3 is output to the gate line GA3 coupled to the third row of the sub-pixels, and a signal ga4 is output to the gate line GA4 coupled to the fourth row of the sub-pixels). And, the timing controller may input an interlaced data control signal to the source driving circuit in the display panel in the even-numbered display frame after the current display frame, so that the source driving circuit generates an interlaced data output signal (such as the signal tp), so as to output the display data corresponding to the sub-pixels in the even-numbered row(s) to each data line. (For example, the source driving circuit is triggered by the rising edge of the signal tp, and may output display data corresponding to a row of sub-pixels).

For example, combining with FIG. 9, a high level of the signal ga2 controls the transistors 01 in the second row of sub-pixels to be turned on, and a low level of the signal ga2 controls the transistors 01 in the second row of sub-pixels to be turned off. A high level of the signal ga4 controls the transistors 01 in the fourth row of sub-pixels to be turned on, and a low level of the signal ga4 controls the transistors 01 of the fourth row of sub-pixels to be turned off. And, the signal ga1 is at a low level in the first display frame, so as to control the transistors 01 in the first row of sub-pixels to be turned off in the first display frame. Moreover, the signal ga3 is at a low level in the first display frame, so as to control the transistors 01 in the sub-pixels in the third row to be turned off in the first display frame.

And, triggered by the first rising edge of the control signal tp, the display data corresponding to each sub-pixel in the second row is output, for example, the display data da1 of the second row and the first column is output to the data line DA1, so that corresponding display data is input to a sub-pixel in the second row and the first column. The display data da2 of the second row and the second column is output to the data line DA2, so that corresponding display data is input to a sub-pixel in the second row and the second column. The display data da3 of the second row and the third column is output to the data line DA3, so that corresponding display data is input to a sub-pixel in the second row and the third column.

And, triggered by the second rising edge of the control signal tp, the display data corresponding to each sub-pixel in the fourth row is output, for example, the display data da1 of the fourth row and the first column is output to the data line DA1, so that corresponding display data is input to a sub-pixel in the fourth row and the first column. The display data da2 of the fourth row and the second column is output to the data line DA2, so that corresponding display data is input to a sub-pixel in the fourth row and the second column. The display data da3 of the fourth row and third column is output to the data line DA3, so that corresponding display data is input to a sub-pixel in the fourth row and third column.

The driving processes corresponding to the remaining rows may be deduced by analogy, and will not be repeated herein.

Moreover, the work processes corresponding to the third display frame and the fifth display frame after the current display frame are basically the same, and will not be repeated herein.

Figure 10:
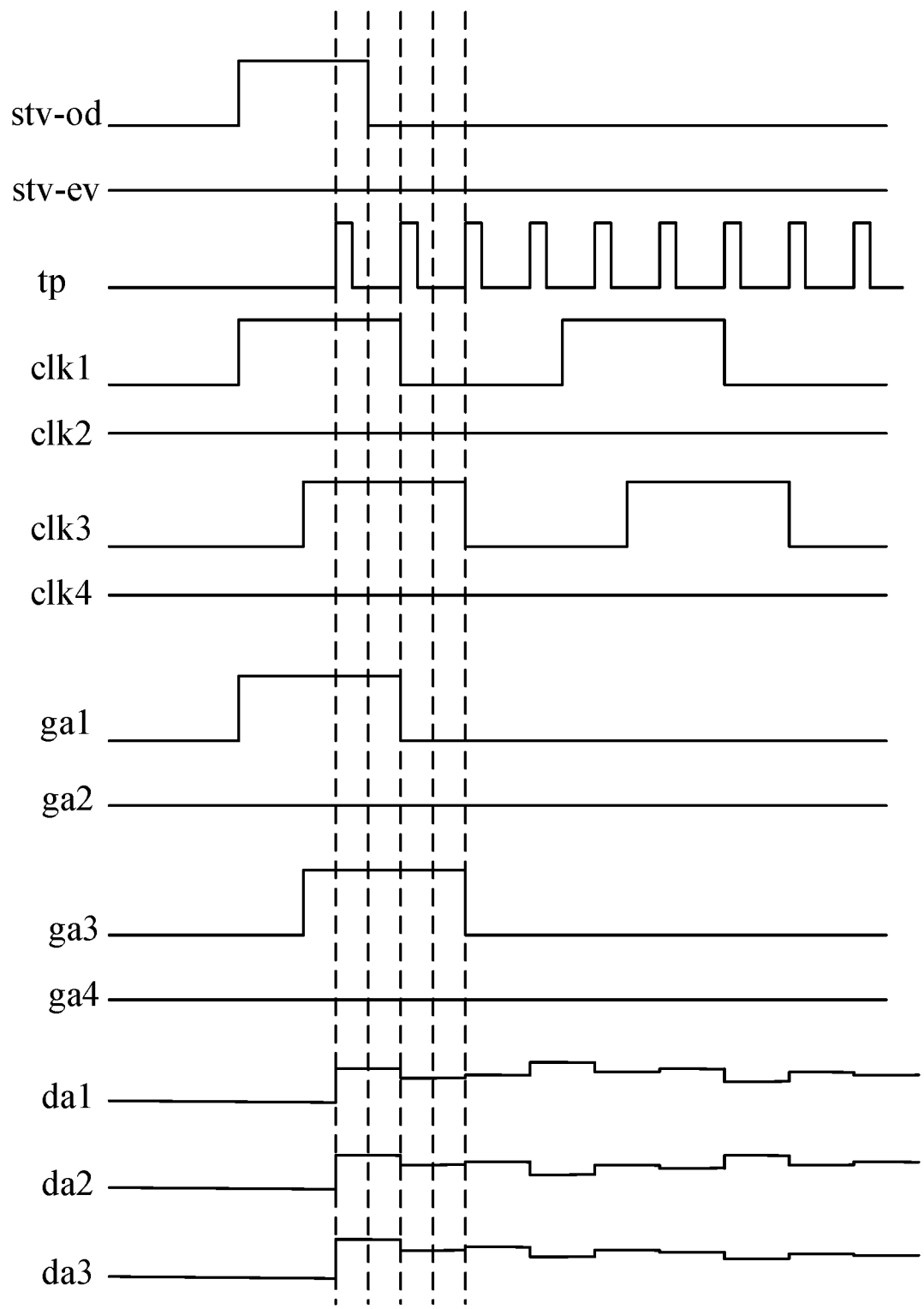
FIG. 10 shows still some other signal timing diagrams according to an embodiment of the present disclosure.

In the embodiments of the present disclosure, with reference to FIG. 1A and FIG. 10, FIG. 10 shows a schematic diagram of signals in a second display frame after the current display frame when the second image is determined to be a defective image. In the embodiments of the present disclosure, when it is determined that the second image is a defective image, the sub-pixels in the odd-numbered row(s) of the display panel may be controlled to be scanned and driven in the even-numbered display frame after the current display frame, and the display data corresponding to the sub-pixels in the odd-numbered row(s) is output to each data line. Exemplarily, in the even-numbered display frame after the current display frame, the timing controller may input an interlaced scanning control signal (such as stv-od, stv-ev, clk1, clk2, clk3, clk4) to the gate driving circuit through the level shift circuit, to control the gate driving circuit to scan and drive the sub-pixels in the odd-numbered row(s) of the display panel (for example, a signal ga1 is output to the gate line GA1 coupled to the first row of sub-pixels, a signal ga2 is output to the gate line GA2 coupled to the second row of sub-pixels, a signal ga3 is output to the gate line GA3 coupled to the third row of sub-pixels, and a signal ga4 is output to the gate line GA4 coupled to the fourth row of sub-pixels). And, the timing controller may input an interlaced data control signal to the source driving circuit in the display panel in the even-numbered display frame after the current display frame, so that the source driving circuit generates an interlaced data output signal (such as the signal tp), so as to output the display data corresponding to the sub-pixels of the odd-numbered row(s) to each data line (for example, the source driving circuit is triggered by the rising edge of the signal tp, and may output the display data corresponding to a row of sub-pixels. For example, triggered by the first rising edge of the control signal tp, the display data corresponding to each sub-pixel in the first row is output, for example, the display data da1 of the first row and the first column is output to the data line DA1, and the display data da2 of the first row and the second column is output to the data line DA2, and the display data da3 of the first row and the third column is output to the data line DA3. Triggered by the second rising edge of the control signal tp, the display data corresponding to each sub-pixel in the third row is output, for example, the display data da1 of the third row and the first column is output to the data line DA1, the display data da2 of the third row and the second column is output to the data line DA2, and the display data da3 of the third row and the third column is output to the data line DA3.).

For example, referring to FIG. 10, a high level of the signal ga1 controls the transistors 01 in the first row of sub-pixels to be turned on, and a low level of the signal ga1 controls the transistors 01 of the first row of sub-pixels to be turned off. A high level of the signal ga3 controls the transistors 01 in the third row of sub-pixels to be turned on, and a low level of the signal ga3 controls the transistors 01 of the third row of sub-pixels to be turned off. And, the signal ga2 is at a low level in the second display frame, so as to control the transistors 01 in the second row of sub-pixels to be turned off in the second display frame. Moreover, the signal ga4 is at a low level in the second display frame, so as to control the transistors 01 in the fourth row of sub-pixels to be turned off in the second display frame.

And, triggered by the first rising edge of the control signal tp, the display data corresponding to each sub-pixel in the first row is output, for example, the display data da1 of the first row and the first column is output to the data line DA1, so that corresponding display data is input to a sub-pixel in the first row and the first column. The display data da2 of the first row and the second column is output to the data line DA2, so that corresponding display data is input to a sub-pixel in the first row and the second column. The display data da3 of the first row and the third column is output to the data line DA3, so that corresponding display data is input to a sub-pixel in the first row and the third column.

And, triggered by the second rising edge of the control signal tp, the display data corresponding to each sub-pixel in the third row is output, for example, the display data da1 of the third row and the first column is output to the data line DA1, so that corresponding display data is input to a sub-pixel in the third row and the first column. The display data da2 of the third row and the second column is output to the data line DA2, so that corresponding display data is input to a sub-pixel in the third row and the second column. The display data da3 of the third row and third column is output to the data line DA3, so that corresponding display data is input to a sub-pixel in the third row and third column.

The driving processes corresponding to the remaining odd-numbered rows may be deduced by analogy, and will not be repeated herein.

Moreover, the work processes corresponding to the fourth display frame and the sixth display frame, etc., after the current display frame are basically the same, and will not be repeated herein.

Embodiments of the present disclosure provide still some methods for driving the display panel, which are modified with respect to the implementation manners in the foregoing embodiments. The following only describes the differences between this embodiment and the above-mentioned embodiments, and the similarities will not be repeated herein.

In the embodiments of the present disclosure, the timing controller and the source driving circuit may be coupled through a general purpose input and output (GPIO) interface, so as to transmit signals through the GPIO interface.

Exemplarily, the timing controller may output a first setting bit with a first number and a second setting bit with the first number and a second number from a general purpose input and output interface, as an interlaced data control signal. And the source driving circuit may generate an interlaced data output signal according to a second setting bit when detecting that the first setting bit is the first number. For example, the first number may be "1", the second number may be "0", the first setting bit may be the 22nd bit, and the second setting bit may be the 23rd bit. In this way, the 22nd bit can carry the digital signal "1", and the 23rd bit can carry the digital signals "1" and "0". The source driving circuit can store the received 22nd bit and 23rd bit into the control packets. According to the digital signal "1" carried by the 22nd bit, the work mode corresponding to the interlaced data control signal in the source driving circuit is enabled, so that the source driving circuit can correspondingly drive the display panel. Moreover, according to the digital signal "1" carried by the 23rd bit, in the even-numbered display frame after the current display frame, the sub-pixels in the even-numbered row(s) of the display panel are controlled to be scanned and driven, and the display data corresponding to the sub-pixels in the even-numbered row(s) is output to each data line. And, according to the digital signal "0" carried by the 23rd bit, in the odd-numbered display frame after the current display frame, the sub-pixels in the odd-numbered row(s) of the display panel are controlled to be scanned and driven, and the display data corresponding to the sub-pixels in the odd-numbered row(s) is output to each data line. Or, according to the digital signal "1" carried by the 23rd bit, in the even-numbered display frame after the current display frame, the sub-pixels in the odd-numbered row(s) of the display panel are controlled to be scanned and driven, and the display data corresponding to the sub-pixels in the odd-numbered row(s) is output to each data line. In addition, in the odd-numbered display frame after the current display frame, the sub-pixels in the even-numbered row(s) of the display panel are controlled to be scanned and driven, and the display data corresponding to the sub-pixels in the even-numbered row(s) is output to each data line.

Exemplarily, the timing controller may output the first setting bit with the second number through the general purpose input and output interface as a progressive data control signal. And the source driving circuit may generate a progressive data output signal when detecting that the first setting bit is the second number. For example, the first number may be "1", the second number may be "0", the first setting bit may be the 22nd bit, and the second setting bit may be the 23rd bit. The 22nd bit may be allowed to carry the digital signal "0". The source driving circuit can store the received 22nd bit into the control packets, so that according to the digital signal "0" carried by the 23rd bit, the work mode corresponding to the progressive data control signal in the source driving circuit is enabled, so that the source driving circuit can drive the display panel accordingly.

Of course, the first number may also be "0", the second number may also be "1", and the first setting bit and the second setting bit may be other bits, which are not limited herein.

Those skilled in the art should understand that the embodiments of the present disclosure may be provided as a method, a system, or a computer program product. Accordingly, the present disclosure can take the form of an entirely hardware embodiment, an entirely software embodiment, or an embodiment combining software and hardware aspects. Furthermore, the present disclosure may take the form of a computer program product embodied on one or more computer-usable storage medium (including but not limited to a disk storage, a CD-ROM, an optical storage, etc.) having an computer-usable program code embodied therein.

The present disclosure is described with reference to flowchart illustrations and/or block diagrams of methods, apparatus (systems), and computer program products according to embodiments of the present disclosure. It should be understood that each procedure and/or block in the flowchart and/or block diagram, and a combination of procedures and/or blocks in the flowchart and/or block diagram can be realized by computer program instructions. These computer program instructions may be provided to a general purpose computer, a special purpose computer, an embedded processor, or a processor of other programmable data processing equipment to produce a machine such that the instructions executed by the processor of the computer or other programmable data processing equipment produce an apparatus for realizing the functions specified in one or more procedures of the flowchart and/or one or more blocks of the block diagram.

These computer program instructions may also be stored in a computer-readable memory capable of directing a computer or other programmable data processing apparatus to operate in a specific manner, such that the instructions stored in the computer-readable memory produce an article of manufacture comprising instruction devices, the instructions device realizes the function specified in one or more procedures of the flowchart and/or one or more blocks of the block diagram.

These computer program instructions can also be loaded onto a computer or other programmable data processing device, causing a series of operational steps to be performed on the computer or other programmable device to produce a computer-implemented process, thus the instructions provide steps for implementing the functions specified in the flow chart or blocks of the flowchart and/or the block or blocks of the block diagrams.

While preferred embodiments of the disclosure have been described, additional changes and modifications to these embodiments can be made by those skilled in the art once the basic inventive concept is appreciated. Therefore, it is intended that the appended claims be construed to cover the preferred embodiment as well as all changes and modifications which fall within the scope of the disclosure.

Apparently, those skilled in the art can make various changes and modifications to the embodiments of the present invention without departing from the spirit and scope of the embodiments of the present invention. In this way, if the modifications and variations of the embodiments of the present invention fall within the scope of the claims of the present invention and equivalent technologies, the present invention also intends to include these modifications and variations.

What is claimed is:

1. A method for driving a display panel, comprising:
   when switching from a first image to a second image and the second image is displayed in at least two consecutive display frames, receiving display data of the second image in a current display frame of the second image;
   determining whether the second image is a defective image according to the display data of the second image and a condition for determining a defective image; and
   when it is determined that the second image is the defective image, controlling the display panel to perform scanning and driving at least one row of sub-pixels apart, and in two rows of sub-pixels that are scanned and driven, when a first row of sub-pixels is driven and a second row of sub-pixels is in a process of being driven, loading display data corresponding to the second row of sub-pixels to data lines connected with the second row of sub-pixels;
   wherein the condition for determining the defective image comprises: a set area threshold of a defective region and a set gray scale difference threshold between gray scales of display data corresponding to two adjacent sub-pixels in a same column; and
   the determining that the second image is the defective image further comprises:
   determining a target region formed by sub-pixels corresponding to display data satisfying the set gray scale difference threshold in the display data of the second image; and
   determining that the second image is the defective image when the target region satisfies the set area threshold;
   wherein the determining the target region formed by the sub-pixels corresponding to the display data satisfying the set gray scale difference threshold in the display data of the second image, further comprises:
   dividing pixel units in the display panel into a plurality of unit groups by taking at least one column of pixel units in at least two adjacent rows as a unit group;
   for display data corresponding to each unit group, determining a gray scale difference between gray scales of display data corresponding to two adjacent rows of
sub-pixels in the same column;

when the gray scale difference satisfies the set gray scale
difference threshold, defining a unit group where sub-
pixels corresponding to the gray scale difference satis-
fying the set gray scale difference threshold are located
as a target unit group; and forming the target region by all target unit groups.

2. The method for driving the display panel according to claim 1, wherein the controlling the display panel to perform scanning and driving at least one row of sub-pixels apart, and in two rows of sub-pixels that are scanned and driven, when the first row of sub-pixels is driven and the second row of sub-pixels is in the process of being driven, loading the display data corresponding to the second row of sub-pixels to the data lines connected with the second row of sub-pixels, further comprises:

in a display frame after the current display frame, controlling the display panel to perform scanning and driving at least one row of sub-pixels apart, and in the two rows of sub-pixels that are scanned and driven, when the first row of sub-pixels is driven and the second row of sub-pixels is in the process of being driven, loading the display data of the second image to the data lines connected with the second row of sub-pixels.

3. The method for driving the display panel according to claim 2, wherein the controlling the display panel to perform scanning and driving at least one row of sub-pixels apart, and in the two rows of sub-pixels that are scanned and driven, when the first row of sub-pixels is driven and the second row of sub-pixels is in the process of being driven, loading the display data of the second image to the data lines connected with the second row of sub-pixels, further comprises:

in an odd-numbered display frame after the current display frame, controlling sub-pixels in an odd-numbered row of the display panel to perform scanning and driving, and outputting display data corresponding to the sub-pixels in the odd-numbered row to each of the data lines; and in an even-numbered display frame after the current display frame, controlling sub-pixels in an even-numbered row of the display panel to perform scanning and driving, and outputting display data corresponding to the sub-pixels in the even-numbered row to each of the data lines.

4. The method for driving the display panel according to claim 2, wherein the controlling the display panel to perform scanning and driving at least one row of sub-pixels apart, further comprises:

in an odd-numbered display frame after the current display frame, controlling sub-pixels in an even-numbered row of the display panel to perform scanning and driving, and outputting display data corresponding to the sub-pixels in the even-numbered row to each of the data lines; and in an even-numbered display frame after the current display frame, controlling sub-pixels of an odd-numbered row of the display panel to performing scanning and driving, and outputting the display data corresponding to the sub-pixels of the odd-numbered row to each of the data lines.

5. A display device comprising:
a display panel; and
a timing controller, configured to receive display data of a second image in a current display frame of the second image when switching from a first image to the second image and the second image is displayed in at least two consecutive display frames; determine whether the second image is a defective image according to the display data of the second image and a condition for determining a defective image; and when it is determined that the second image is the defective image, input an interlaced scanning control signal to a gate driving circuit of the display panel and input an interlaced data control signal to a source driving circuit of the display panel, to control the display panel to perform scanning and driving at least one row of sub-pixels apart, and to load display data corresponding to a second row of sub-pixels to data lines connected with the second row of sub-pixels when a first row of sub-pixels is driven and the second row of sub-pixels is in a process of being driven in two rows of sub-pixels that are scanned and driven;

wherein the condition for determining the defective image comprises: a set area threshold of a defective region and a set gray scale difference threshold between gray scales of display data corresponding to two adjacent sub-pixels in a same column;

wherein the timing controller is further configured to:
determine a target region formed by sub-pixels corresponding to display data satisfying the set gray scale difference threshold in the display data of the second image; and
determine that the second image is the defective image when the target region satisfies the set area threshold;

wherein the timing controller is further configured to:
divide pixel units in the display panel into a plurality of unit groups by taking at least one column of pixel units in at least two adjacent rows as a unit group;
for display data corresponding to each unit group, determine a gray scale difference between gray scales of display data corresponding to two adjacent rows of sub-pixels in the same column;
when the gray scale difference satisfies the set gray scale difference threshold, define a unit group where sub-pixels corresponding to the gray scale difference satisfying the set gray scale difference threshold are located as a target unit group; and
form the target region by all target unit groups.

6. The display device according to claim 5, wherein the timing controller is further configured to: input a progressive scanning control signal to the gate driving circuit of the display panel and input a progressive data control signal to the source driving circuit of the display panel when it is determined that the second image is not the defective picture, control the display panel to scan and drive sub-pixels row by row, and load display data corresponding to each row of sub-pixels to each of the data lines.

7. The display device according to claim 6, wherein the timing controller and the source driving circuit are coupled through a general purpose input and output interface;

the timing controller is further configured to output the interlaced data control signal by setting a driving enable pin of the general purpose input and output interface to an active level of interlaced driving; and output the progressive data control signal by setting the driving enable pin of the general purpose input and output interface to an active level of progressive driving; and the source driving circuit is further configured to generate an interlaced data output signal when detecting that a level of the driving enable pin is the active level of interlaced driving, and load the display data corresponding to the second row of sub-pixels to the data lines connected with the second row of sub-pixels according to the generated interlaced data output signal; and generate a progressive data output signal when detecting that the level of the driving enable pin is the active level of progressive driving, and load the display data corresponding to each row of sub-pixels to each of the data lines according to the generated progressive data output signal.

8. The display device according to claim 7, wherein the timing controller is further configured to switch the level of the driving enable pin from a first level to a second level, as the active level of interlaced driving; and maintain the level of the driving enable pin at the first level, as the active level of progressive driving; and the source driving circuit is further configured to compare a voltage corresponding to the level of the driving enable pin with a stored set voltage threshold, generate the interlaced data output signal when the voltage corresponding to the level of the driving enable pin is higher than the set voltage threshold, and generate the progressive data output signal when the voltage corresponding to the level of the driving enable pin is not higher than the set voltage threshold.

9. The display device according to claim 6, wherein the timing controller is coupled to a level shift circuit through a general purpose input and output interface;

the timing controller is further configured to output a first setting bit with a first number and a second setting bit with the first number and a second number through the general purpose input and output interface, as the interlaced data control signal for output; and output a first setting bit with a second number through the general purpose input and output interface, as a progressive driving enable signal for output; and the source driving circuit is further configured to generate the interlaced data output signal according to the second setting bit when detecting that the first setting bit is the first number; and generate the progressive data output signal when detecting that the first setting bit is the second number.

* * * * *